United States Patent
Kataoka

(10) Patent No.: US 8,410,919 B2
(45) Date of Patent: Apr. 2, 2013

(54) DRIVING SUPPORT APPARATUS

(75) Inventor: Hiroaki Kataoka, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 646 days.

(21) Appl. No.: 12/591,212

(22) Filed: Nov. 12, 2009

(65) Prior Publication Data

US 2010/0295668 A1 Nov. 25, 2010

(30) Foreign Application Priority Data

May 22, 2009 (JP) ................ 2009-124205

(51) Int. Cl.
*B60Q 1/00* (2006.01)

(52) U.S. Cl. ........ 340/435; 340/903; 340/905; 340/436; 340/937; 180/169

(58) Field of Classification Search ............... 340/903, 340/905, 435, 436, 937; 180/169
See application file for complete search history.

(56) References Cited

U.S. PATENT DOCUMENTS

| | | | |
|---|---|---|---|
| 6,163,022 A * | 12/2000 | Yasui et al. | 250/208.1 |
| 6,191,704 B1 * | 2/2001 | Takenaga et al. | 340/903 |
| 6,360,170 B1 * | 3/2002 | Ishikawa et al. | 701/300 |
| 6,442,453 B1 * | 8/2002 | Fukuoka | 701/1 |
| 2003/0146827 A1 | 8/2003 | Koike | |
| 2008/0021613 A1 | 1/2008 | Hamaguchi et al. | |
| 2009/0088966 A1 | 4/2009 | Yokoyama et al. | |
| 2012/0010808 A1 | 1/2012 | Yokoyama et al. | |

FOREIGN PATENT DOCUMENTS

| | | |
|---|---|---|
| EP | 2 012 211 A1 | 1/2009 |
| JP | A-11-025397 | 1/1999 |
| JP | A-2000-215396 | 8/2000 |
| JP | A-2003-44836 | 2/2003 |
| JP | A-2003-231450 | 8/2003 |
| JP | A-2007-8281 | 1/2007 |
| JP | A-2007-331714 | 12/2007 |
| JP | A-2009-023487 | 2/2009 |
| JP | A-2009-078733 | 4/2009 |
| JP | A-2009-78733 | 4/2009 |

\* cited by examiner

*Primary Examiner* — Daryl Pope
(74) *Attorney, Agent, or Firm* — Oliff & Berridge, PLC

(57) ABSTRACT

A driving support ECU comprises: a roadside object detection section for detecting, in a case where a lane marking WR on at least one of the right side and left side is detected by a white line detection section and another lane marking WL is not detected, a roadside object GL on the other of the right side and left side; a white line estimation part for estimating a position of a lane marking VL1 on the other of the right side and the left side based on the detected roadside object GL; and an information outputting section for determining a departure from the lane in which the vehicle VC is running, based on the estimated position of the lane marking VL1 on the other of the right side and left side.

4 Claims, 20 Drawing Sheets dot # DRIVING SUPPORT APPARATUS

BACKGROUND OF THE INVENTION

1. Field of the Invention

The present invention relates to a driving support apparatus which is mounted in, for example, a vehicle and operable to output driving support information to a driver.

2. Description of the Background Art

Conventionally, there has been known a technology in which lane markings (so-called while lines) installed on right and left sides of a lane in which a vehicle is running are detected via a CCD (Charge Coupled Device) camera or the like and based on the detected lane markings, a driver is notified of driving support information in order to prevent a departure from the lane. However, in a case where the lane markings cannot be detected, it may occur that the driving support information cannot be accurately notified. In order to solve this problem, a variety of apparatuses, methods, and the like have been proposed (for example, refer to Japanese Patent Application Laid-Open Publication No. 2003-44836).

A partition line recognition apparatus disclosed in Japanese Patent Application Laid-Open Publication No. 2003-44836 has: an image processing part for extracting, from an image shot by a camera, white lines (which correspond to lane markings) painted on a road surface; and a white line estimation part for estimating, when the image processing part extracts either one of the white lines on the right or left side, a position of the other of the white lines, which is not extracted, based on coordinates of a plurality of sample points which are set on the extracted white line, based on road width calculation parameters which correspond to the sample points, and based on data of a road width of the lane in which the vehicle is running. This partition line recognition apparatus allows the other partition line to be estimated from the one partition line (white line or the like) which was allowed to be detected.

However, since in the partition line recognition apparatus disclosed in Japanese Patent Application Laid-Open Publication No. 2003-44836, the position of the lane marking on the side, which is not detected, is estimated based on the data of the road width of the lane in which the vehicle is running, and the like, it may occur that the position of the lane marking on the side, which is not detected, cannot be accurately detected. Specifically, in the partition line recognition apparatus disclosed in Japanese Patent Application Laid-Open Publication No. 2003-44836, based on the coordinates of the plurality of sample points, which are set on the extracted lane marking, and the road width calculation parameters corresponding to the sample points, and the data of the road width of the lane in which the vehicle is running, the position of the lane marking on the side, which is not detected, is estimated. Therefore, in a case where the road width calculation parameters, the data of the road width, and the like are not accurate, the position of the lane marking on the side, which is not detected, cannot be accurately estimated.

In addition, even in a state in which the lane marking can be accurately detected, there may be a case where it is preferable that the position of the lane marking, which is used for a purpose of, for example, preventing a departure from the lane, is set so as to be located more inward than the position estimated based on the position of the detected lane marking (namely, the real lane marking). Specifically, in a case where a sidewall made of concrete or the like, which is supposed to bring about devastating damage on a vehicle if the vehicle contacts the sidewall, is installed outside the detected lane marking, it is preferable that the position of the lane marking used for the purpose of preventing the departure from the lane is set so as to be located more inward than the position of the detected lane marking.

SUMMARY OF THE INVENTION

In view of the above-described situation, the present invention was made. An object of the present invention is to provide a driving support apparatus operable to properly estimate positions of lane markings and to output proper driving support information.

In order to achieve the above-mentioned object, the present invention has the following features. A first aspect of the present invention is directed to a driving support apparatus, mounted in a vehicle and operable to output driving support information to a driver, comprising: a white line detection part for detecting a lane marking installed on at least one of a right side and a left side of a lane in which the vehicle is running; a roadside object detection part for detecting, in a case where one of lane markings on one of the right side and the left side is detected and the other of the lane markings on the other of the right side and the left side is not detected by the white line detection part, a roadside object on the other of the right side and the left side; a white line estimation part for estimating a position of the other of the lane markings on the other of the right side and the left side based on the roadside object detected by the roadside object detection part; and an information outputting part for outputting the driving support information based on the position of the other of the lane markings on the other of the right side and the left side, the position estimated by the white line estimation part.

In a second aspect of the present invention based on the above-mentioned first aspect, the roadside object detection part detects, as the roadside object on the other of the right side and the left side, a roadside object being in parallel with the one of the lane markings on the one of the right side and the left side or having a substantially same curvature radius as a curvature radius which the one of the lane markings on the one of the right side and the left side has.

In a third aspect of the present invention based on the above-mentioned first aspect, the white line estimation part estimates, as a position of the other of the lane markings on the other of the right side and the left side, a position which is located at a predetermined first distance inward of the lane, in which the vehicle is running, from the position of the roadside object detected by the roadside object detection part.

In a fourth aspect of the present invention based on the above-mentioned first aspect, the information outputting part outputs the driving support information for preventing a departure from the lane in which the vehicle is running.

A fifth aspect of the present invention is directed to a driving support apparatus, mounted in a vehicle and operable to output driving support information to a driver, comprising: a white line detection part for detecting a lane marking installed on at least one of a right side and a left side of a lane in which the vehicle is running; a roadside object detection part for detecting a roadside object installed on said at least one of the right side and the left side of the lane in which the vehicle is running; a virtual lane marking estimation part for estimating, based on the lane marking detected by the white line detection part and the roadside object detected by the roadside object detection part, a position of a virtual lane marking used for outputting the driving support information; and an information outputting part for outputting the driving support information based on the position of the virtual lane marking, the position estimated by the virtual lane marking estimation part.

In a sixth aspect of the present invention based on the above-mentioned fifth aspect, in a case where the lane marking on said at least one of the right side and left side of the lane in which the vehicle is running is detected and on said at least one of the right side and left side, the roadside object is detected by the roadside object detection part, the virtual lane marking estimation part estimates, as the position of the virtual lane marking, a position which is located at a predetermined second distance inward of the lane, in which the vehicle is running, from the position of the lane marking.

In a seventh aspect of the present invention based on the above-mentioned sixth aspect, the driving support apparatus comprises a distance setting part for setting the second distance, the roadside object detection part judges a category of the roadside object, the distance setting part sets the second distance based on the category of the roadside object, judged by the roadside object detection part, and the virtual lane marking estimation part estimates, as the position of the virtual lane marking, a position which is located at the second distance inward of the lane, in which the vehicle is running, from the position of the lane marking, the second distance set by the distance setting part.

In an eighth aspect of the present invention based on the above-mentioned seventh aspect, based on the category of the roadside object, the distance setting part estimates a degree of damage in a case of a collision with the roadside object and sets as the second distance a value whose magnitude increases in accordance with an increase in the degree of damage, the category judged by the roadside object detection part.

In a ninth aspect of the present invention based on the above-mentioned fifth aspect, the information outputting part outputs the driving support information for preventing a departure from the lane in which the vehicle is running.

A tenth aspect of the present invention is directed to a driving support apparatus, mounted in a vehicle and operable to output driving support information to a driver, comprising: a white line detection part for detecting a lane marking installed on at least one of a right side and a left side of a lane in which the vehicle is running; a lane determination part for determining, based on information indicating a position of the vehicle and map information, whether or not a road on which the vehicle is running has a center line; a center line estimation part for estimating, in a case where the lane determination part determines that the road does not have the center line, a position of a virtual center line based on the lane marking detected by the white line detection part; and an information outputting part for outputting the driving support information based on the position of the virtual center line, detected by the center line estimation part.

In an eleventh aspect of the present invention based on the above-mentioned tenth aspect, the center line estimation part estimates as the position of the virtual center line a substantially center position between lane markings on both of the right side and the left side, the lane markings detected by the white line detection part.

In a twelfth aspect of the present invention based on the above-mentioned tenth aspect, the information outputting part outputs the driving support information for preventing a departure from the lane on which the vehicle is running.

A thirteenth aspect of the present invention is directed to a driving support apparatus, mounted in a vehicle and operable to output driving support information to a driver, comprising: a white line detection part for detecting a lane marking installed on at least one of a right side and a left side of a lane in which the vehicle is running; a stopping lane determination part for determining, based on information indicating a position of the vehicle and map information, whether or not there is a vehicle stopping bay, whose lane marking is shifted outward by a predetermined width of a stopping lane, in front of the vehicle; a lane marking correction part for correcting, in a case where the stopping lane determination part determines that there is the vehicle stopping bay, a position of the lane marking on said at least one of the right side and the left side, on which the vehicle stopping bay is installed, based on the lane marking detected by the white line detection part; and an information outputting part for outputting the driving support information based on the position of the lane marking, corrected by the lane marking correction part.

In fourteenth aspect of the present invention based on the above-mentioned thirteenth aspect, based on a position of a lane marking installed behind the vehicle stopping bay, the lane marking correction part corrects a position of a lane marking on a side on which the vehicle stopping bay is installed.

In a fifteenth aspect of the present invention based on the above-mentioned thirteenth aspect, based on a position of a lane marking on a side on which the vehicle stopping bay is not installed, the lane marking correction part corrects the position of the lane marking on the side on which the vehicle stopping bay is installed.

In a sixteenth aspect of the present invention based on the above-mentioned thirteenth aspect, the information outputting part outputs the driving support information for preventing a departure from the lane in which the vehicle is running.

A seventeenth aspect of the present invention is directed to a driving support apparatus, mounted in a vehicle and operable to output driving support information to a driver, comprising: a white line detection part for detecting a lane marking installed on at least one of a right side and a left side of a lane in which the vehicle is running; a fork determination part for determining, based on information indicating a position of the vehicle and map information, whether or not there is a fork spot in a road, on which the vehicle is running, in front of the vehicle; a direction estimation part for estimating a traveling direction of the vehicle at the fork spot in the road; a virtual lane marking estimation part for generating at the fork spot in the road, in a case where the fork determination part determines that there is the fork spot in the road, a virtual lane marking used for outputting the driving support information so as to traverse a forked road which is not in the traveling direction estimated by the direction estimation part; and an information outputting part for outputting the driving support information based on a position of the virtual lane marking estimated by the virtual lane marking estimation part.

In a eighteenth aspect of the present invention based on the above-mentioned seventeenth aspect, the driving support apparatus comprises an operation acquisition part for acquiring operation information indicating information of an operation performed by a driver, and the direction estimation part estimates the traveling direction of the vehicle at the fork spot in the road based on the operation information acquired by the operation acquisition part.

In a nineteenth aspect of the present invention based on the above-mentioned eighteenth aspect, the operation acquisition part acquires, as the operation information, at least one of steering operation information and turn signal operation information.

In a twentieth aspect of the present invention based on the above-mentioned seventeenth aspect, the direction estimation part estimates the traveling direction of the vehicle at the fork spot in the road based on routing assistance information from a navigation system.

In a twenty-first aspect of the present invention based on the above-mentioned seventeenth aspect, the virtual lane marking estimation part generates, in a case where the direction estimation part estimates that the vehicle heads toward a right side of the forked road, the virtual lane marking along the lane marking on the right side, detected by the white line detection part, and generates, in a case where the direction estimation part estimates that the vehicle heads toward a left side of the forked road, the virtual lane marking along the lane marking on the left side, detected by the white line detection part.

In a twenty-second aspect of the present invention based on the above-mentioned seventeenth aspect, the driving support apparatus comprises: a reliability estimation part for estimating reliability of a position of the lane marking detected by the white line detection part; and a position correction part for correcting, based on the reliability of the position of the lane marking, a position of the virtual lane marking generated by the virtual lane marking estimation part, the reliability estimated by the reliability estimation part, and the information outputting part outputs the driving support information based on the position of the virtual lane marking, corrected by the position correction part.

In a twenty-third aspect of the present invention based on the above-mentioned twenty-second aspect, the reliability estimation part estimates the reliability of the position of the lane marking based on a category of the lane marking detected by the white line detection part.

In a twenty-fourth aspect of the present invention based on the above-mentioned twenty-third aspect, as the category of the lane marking, at least one of a white solid line, a white broken line, a yellow broken line, Botts' dots, and cat's-eyes is included, and the reliability estimation part estimates that the reliability descends in order of the white solid line, the white broken line, the yellow broken line, the Botts' dots and the cat's-eyes.

In a twenty-fifth aspect of the present invention based on the above-mentioned twenty-second aspect, the position correction part corrects the position of the virtual lane marking generated by the virtual lane marking estimation part more outward in accordance with a decrease in the reliability of the position of the lane marking, estimated by the reliability estimation part.

In a twenty-sixth aspect of the present invention based on the above-mentioned seventeenth aspect based on the above-mentioned twenty-second aspect, the information outputting part outputs the driving support information for preventing a departure from the lane in which the vehicle is running.

According to the above-mentioned first aspect, the lane markings installed on the right and left sides of the lane in which the vehicle is running are detected. In the case where the one of the lane markings on the one side is detected and the other of the lane markings on the other side is not detected, the roadside object on the other side is detected. In addition, based on the detected roadside object, the position of the other of the lane markings on the other side is estimated. Further, based on the estimated position of the other of the lane markings on the other side, the driving support information is outputted. Accordingly, the position of the lane marking can be properly estimated and the proper driving support information can be outputted.

In other words, in the case where the one of the lane markings on the one side is detected and the other of the lane markings on the other side is not detected, the roadside object GL on the other side is detected, and based on the detected roadside object GL, the position of the lane marking VL1 on the other side is estimated, whereby the position of the lane marking VL1 can be properly estimated (see FIG. 3). In addition, based on the properly estimated position of the lane marking VL1, the driving support information is outputted, whereby the proper driving support information can be outputted.

According to the above-mentioned second aspect, the roadside object detection part detects, as the roadside object on the other of the right side and the left side, the roadside object being in parallel with the lane marking on the one of the right side and the left side or having a substantially same curvature radius as a curvature radius which the one of the lane markings on the one of the right side and the left side has. Accordingly, the position of the lane marking can be further properly estimated.

In other words, since the roadside object GL being in parallel with the lane marking on the one of the right side and the left side or having the substantially same curvature radius as the curvature radius which the one of the lane markings on the one of the right side and the left side has is detected, the roadside object GL, such as a guardrail, a median strip, a sidewall, a curb stone, which is useful for estimating the position of the lane marking VL1 on the other of the right side and the left side is detected, whereby the position of the lane marking VL1 can be further properly estimated (see FIG. 3).

According to the above-mentioned third aspect, the position which is located at the predetermined first distance inward of the lane, in which the vehicle is running, from the position of the roadside object is estimated as the position of the other of the lane markings on the other of the right side and the left side. Accordingly, the position of the lane marking can be further properly estimated.

In other words, since the position which is located at the predetermined first distance $\Delta L1$ inward of the lane, in which the vehicle is running, from the position of the roadside object GL, is estimated as the position of the lane marking VL1 on the other of the right side and the left side, the position of the lane marking VL1 can be further properly estimated by setting the first distance $\Delta L1$ to be a proper value (see FIG. 3).

For example, a category of the roadside object GL may be judged and based on the judged category of the roadside object GL, a degree of damage caused in a case of a collision with the roadside object GL may be estimated, and a value of the first distance $\Delta L1$ may be set so as to increase in accordance with an increase in the estimated degree of the damage (see FIG. 3). In this case, since with respect to a roadside object GL having a large degree of the damage caused in a case of the collision, a position of the lane marking VL1 is estimated so as to allow a clearance (that is, a position away from the roadside object GL is estimated), a risk of colliding with the roadside object GL is reduced, whereby the position of the lane marking VL1 can be further properly estimated.

According to the above-mentioned fourth aspect, the driving support information for preventing the departure from the lane in which the vehicle is running is outputted. Accordingly, the proper driving support information for preventing the departure from the lane in which the vehicle is running can be outputted.

According to the above-mentioned fifth aspect, the lane marking installed on at least one of the right side and the left side of the lane in which the vehicle is running is detected. The roadside object installed on at least one of the right side and the left side of the lane in which the vehicle is running is detected. In addition, based on the lane marking and the detected roadside object, the position of the virtual lane marking used for outputting the driving support information is estimated. Further, based on the estimated position of the virtual lane marking, the driving support information is outputted. Accordingly, the position of the virtual lane marking used for outputting the driving support information can be properly estimated and the proper driving support information can be outputted.

In other words, based on the detected lane marking WL and the detected roadside object WA, the position of the virtual lane marking VL2 used for outputting the driving support information is estimated, whereby the position of the virtual lane marking VL2 can be properly estimated (see FIG. 6). In addition, based on the properly estimated position of the virtual lane marking VL2, the driving support information is outputted, whereby the proper driving support information can be outputted.

According to the above-mentioned sixth aspect, in a case where one of the lane markings on at least one of the right side and the left side of the lane in which the vehicle is running is detected and on said at least one of the right side and left side, the roadside object is detected, the position which is located at the predetermined second distance inward of the lane, in which the vehicle is running, from the position of the lane marking is estimated as the position of the virtual lane marking. Accordingly, the position of the virtual lane marking can be further properly estimated.

In other words, in the case where on the side on which the lane marking WL is detected, the roadside object WA is detected, the position which is located at the predetermined second distance ΔL2 inward of the lane, in which the vehicle is running, from the position of the lane marking WL is estimated as the position of the virtual lane marking VL2, and the position of the virtual lane marking VL2 can be further properly estimated by setting the second distance ΔL2 to be a proper value (see FIG. 6).

According to the above-mentioned seventh aspect, the category of the roadside object is judged. Based on the judged category of the roadside object, the second distance is set. In addition, the position which is located at the set second distance inward of the lane, in which the vehicle is running, from the position of the lane marking is estimated as the position of the virtual lane marking. Accordingly, the position of the virtual lane marking can be further properly estimated.

In other words, the category of the roadside object WA is judged, and based on the judged category of the roadside object WA, the second distance ΔL2 is set, thereby allowing the second distance ΔL2 to be set to a proper value. Thus, the position of the virtual lane marking VL2 can be further properly estimated (see FIG. 6).

According to the above-mentioned eighth aspect, based on the judged category of the roadside object, the degree of damage in the case of the collision with the roadside object is estimated, and as the second distance, the value whose magnitude increases in accordance with the increase in the estimated degree of damage is set. Accordingly, the position of the virtual lane marking can be further properly estimated.

In other words, with respect to a roadside object WA having a large degree of damage caused in the case of the collision, the position of the virtual lane marking VL2 is estimated so as to allow a clearance (that is, a position away from the roadside object WA is estimated), thereby reducing a risk of colliding with the roadside object WA. Thus, the position of the lane marking VL2 can be further properly estimated (see FIG. 6).

According to the above-mentioned ninth aspect, the driving support information for preventing the departure from the lane in which the vehicle is running is outputted. Accordingly, the proper driving support information for preventing the departure from the lane in which the vehicle is running can be outputted.

According to the above-mentioned tenth aspect, the lane marking installed on said at least one of the right side and the left side of the lane in which the vehicle is running is detected. Based on the information indicating the position of the vehicle and the map information, it is determined whether or not the road on which the vehicle is running has the center line. In addition, in the case where it is determined that the road does not have the center line, based on the detected lane marking, the position of the virtual center line is estimated. Further, based on the estimated position of the virtual center line, the driving support information is outputted. Accordingly, the position of the virtual center line used for outputting the driving support information is properly estimated and the proper driving support information can be outputted.

In other words, based on the information indicating the position of the vehicle and the map information, it is determined whether or not the road on which the vehicle is running has the center line, whereby whether or not the road on which the vehicle is running has the center line can be properly determined. In addition, in the case where it is determined that the road does not have the center line, the position of the virtual center line is estimated based on the detected lane marking, thereby allowing the proper position of the virtual center line to be estimated. Further, based on the properly estimated position of the virtual center line, the driving support information is outputted, thereby allowing the proper driving support information to be outputted.

According to the above-mentioned eleventh aspect, as the position of the virtual center line VL3, the substantially center position between the lane markings WR and WL on the both of the right side and the left side is estimated (see FIG. 9). Accordingly, the position of the virtual center line VL3, which is used for outputting the driving support information, can be further properly estimated.

According to the above-mentioned twelfth aspect, the driving support information for preventing the departure from the lane on which the vehicle is running is outputted. Accordingly, the proper driving support information for preventing the departure from the lane on which the vehicle is running can be outputted.

According to the above-mentioned thirteenth aspect, the lane marking installed on said at least one of the right side and the left side of the lane in which the vehicle is running is detected. Based on the information indicating the position of the vehicle and the map information, it is determined whether or not there is the vehicle stopping bay, whose lane marking is shifted outward by the predetermined width of the stopping lane, in front of the vehicle. In the case where it is determined that there is the vehicle stopping bay, based on the detected lane marking, the position of the lane marking on said at least one of the right side and the left side, on which the vehicle stopping bay is installed, is corrected. Further, based on the corrected position of the lane marking, the driving support information is outputted. Accordingly, the position of the lane marking is properly corrected, whereby the proper driving support information can be outputted.

In other words, based on the information indicating the position of the vehicle and the map information, it is determined whether or not there is the vehicle stopping bay, whose lane marking is shifted outward by the predetermined width of the stopping lane, in front of the vehicle, whereby it can be properly determined whether or not there is the vehicle stopping bay. In addition, in the case where it is determined that there is the vehicle stopping bay, based on the detected lane marking, the position of the lane marking on the side on which the vehicle stopping bay is installed is corrected, thereby allowing the position of the lane marking to be properly corrected. Further, based on the corrected position of the lane marking, the driving support information is outputted, thereby allowing the proper driving support information to be outputted.

According to the above-mentioned fourteenth aspect, based on the position of the lane marking installed behind the vehicle stopping bay, the position of the lane marking on the side on which the vehicle stopping bay is installed is corrected. Accordingly, the position of the lane marking can be further properly corrected.

In other words, for example, with the position of the lane marking WL installed behind the vehicle stopping bay as a starting point, by extending the lane marking VWL so as to be in parallel with the lane marking WR on the side on which the vehicle stopping bay is not installed, the position of the lane marking WL on the side on which the vehicle stopping bay is installed can be properly corrected (that is, the position of the lane marking VWL, which has been corrected, is obtained) (see FIG. 12).

According to the above-mentioned fifteenth aspect, based on the position of the lane marking on the side on which the vehicle stopping bay is not installed, the position of the lane marking on the side on which the vehicle stopping bay is installed is corrected. Accordingly, the position of the lane marking can be further properly corrected.

In other words, for example, with the position of the lane marking WL installed behind the vehicle stopping bay as a starting point, by extending the lane marking VWL so as to be in parallel with the lane marking WR on the side on which the vehicle stopping bay is not installed, the position of the lane marking WL on the side on which the vehicle stopping bay is installed can be properly corrected (that is, the position of the lane marking VWL, which has been corrected, is obtained) (see FIG. 12).

According to the above-mentioned sixteenth aspect, the driving support information for preventing the departure from the lane in which the vehicle is running is outputted. Accordingly, the proper driving support information for preventing the departure from the lane in which the vehicle is running can be outputted.

According to the above-mentioned seventeenth aspect, the lane marking installed on said at least one of the right side and the left side of the lane in which the vehicle is running is detected. Based on the information indicating the position of the vehicle and the map information, it is determined whether or not there is the fork spot in the road, on which the vehicle is running, in front of the vehicle. In addition, a traveling direction of the vehicle at the fork spot in the road is estimated. Further, in the case where it is determined that there is the fork spot in the road, at the fork spot in the road, the virtual lane marking used for outputting the driving support information is generated so as to traverse the forked road which is not in the estimated traveling direction. In addition, based on the estimated position of the virtual lane marking, the driving support information is outputted. Accordingly, the position of the virtual lane marking can be properly estimated and the proper driving support information can be outputted.

In other words, based on the information indicating the position of the vehicle and the map information, it is determined whether or not there is the fork spot in the road, on which the vehicle is running, in front of the vehicle, whereby it can be properly determined whether or not there is the fork spot in the road. In addition, in the case where there is the fork spot in the road, at the fork spot in the road, the virtual lane markings VWR and VWL used for outputting the driving support information is generated so as to traverse the forked road which is not in the estimated traveling direction, thereby the positions of the virtual lane markings VWR and VWL to be properly estimated (see FIG. 15). Further, based on the estimated positions of the virtual lane markings VWR and VWL, the driving support information is outputted, thereby allowing the proper driving support information to be outputted.

According to the above-mentioned eighteenth aspect, the operation information indicating the information of the operation performed by a driver is acquired. Based on the acquired operation information, the traveling direction of the vehicle at the fork spot in the road is estimated. Accordingly, the traveling direction of the vehicle can be properly estimated.

According to the above-mentioned nineteenth aspect, as the operation information, said at least one of the steering operation information and the turn signal operation information is acquired. Accordingly, the traveling direction of the vehicle can be further properly estimated.

In other words, for example, in a case where there is a fork spot at which a road forks in oblique right and left directions in front and steering operation information indicating a steering operation in the right direction is acquired, it can be estimated that a traveling direction is the oblique right direction. In addition, for example, in a case where there is a fork spot at which a road forks in oblique right and left directions in front and turn signal operation information indicating a turn signal operation in the left direction is acquired, it can be estimated that a traveling direction is the oblique left direction.

According to the above-mentioned twentieth aspect, based on the routing assistance information from the navigation system, the traveling direction of the vehicle at the fork spot in the road is estimated. Accordingly, the traveling direction of the vehicle can be further properly estimated.

In other words, since it is often the case that a driver performs an operation in accordance with the routing assistance information from the navigation system (that is, it is often the case that the vehicle heads in a direction indicated by the routing assistance information), based on the routing assistance information from the navigation system, the traveling direction of the vehicle can be further properly estimated.

According to the above-mentioned twenty-first aspect, in the case where it is estimated that the vehicle heads toward a right side of the forked road, the virtual lane marking along the detected lane marking on the right side is generated, and in the case where it is estimated that the vehicle heads toward a left side of the forked road, the virtual lane marking along the detected lane marking on the left side is generated. Accordingly, the position of the virtual lane marking can be properly estimated.

In other words, in the case where it is estimated that the vehicle heads toward the right side of the forked road, the virtual lane marking VWL along the detected lane marking WR on the right side is generated, and in the case where it is estimated that the vehicle heads toward the left side of the forked road, the virtual lane marking VWR along the detected lane marking WL on the left side is generated, thereby allowing the positions of the virtual lane markings VWR and VWL to be properly estimated (see FIG. 15).

According to the above-mentioned twenty-second aspect, the reliability of the position of the detected lane marking is estimated. In addition, based on the estimated reliability of the position of the lane marking, the position of the generated virtual lane marking is corrected. Further, based on the corrected position of the virtual lane marking, the driving support information is outputted. Accordingly, the position of the virtual lane marking is properly corrected and the further proper driving support information can be outputted.

In other words, for example, since the lower the reliability of the position of the detected lane marking is, the lower the estimated reliability of the position of the generated virtual lane marking is, it is preferable to correct the position of the generated virtual lane marking outward of the lane in order to prevent the driving apparatus from unnecessarily being operated. Thus, since based on the reliability of the position of the detected lane marking, the position of the generated virtual lane marking is properly corrected, unnecessarily operating the driving support apparatus can be prevented, thereby allowing the further proper driving support information to be outputted.

According to the above-mentioned twenty-third aspect, based on the detected category of the lane marking, the reliability of the position of the lane marking is estimated. Accordingly, the reliability of the reliability of the position of the detected lane marking can be properly estimated.

According to the above-mentioned the twenty-fourth aspect, it is estimated that the reliability descends in order of the white solid line, the white broken line, the yellow broken line, the Botts' dots, and the cat's-eyes. Accordingly, the reliability of the position of the detected lane marking can be further properly estimated.

According to the above-mentioned twenty-fifth, the position of the generated virtual lane marking is corrected more outward in accordance with the decrease in the estimated reliability of the position of the lane marking. Accordingly, the position of the virtual lane marking can be further properly corrected.

In other words, since the lower the reliability of the position of the detected lane marking is, the lower the estimated reliability of the position of the generated virtual lane marking is, it is preferable to correct the position of the generated virtual lane marking outward of the lane in order to prevent the driving apparatus from unnecessarily being operated. Thus, the position of the generated virtual lane marking is corrected more outward in accordance with the decrease in the estimated reliability of the position of the lane marking, whereby the position of the generated virtual lane marking can be further properly corrected.

According to the above-mentioned twenty-sixth aspect, the driving support information for preventing the departure from the lane in which the vehicle is running is outputted. Accordingly, the proper driving support information for preventing the departure from the lane in which the vehicle is running can be outputted.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, with reference to drawings, embodiments of a driving support apparatus according to the present invention will be described. The driving support apparatus according to the present invention is mounted in a vehicle and operable to output driving support information to a driver. First, with reference to FIG. 1, one example of a configuration of the driving support apparatus mounted in the vehicle will be described.

Figure 1:
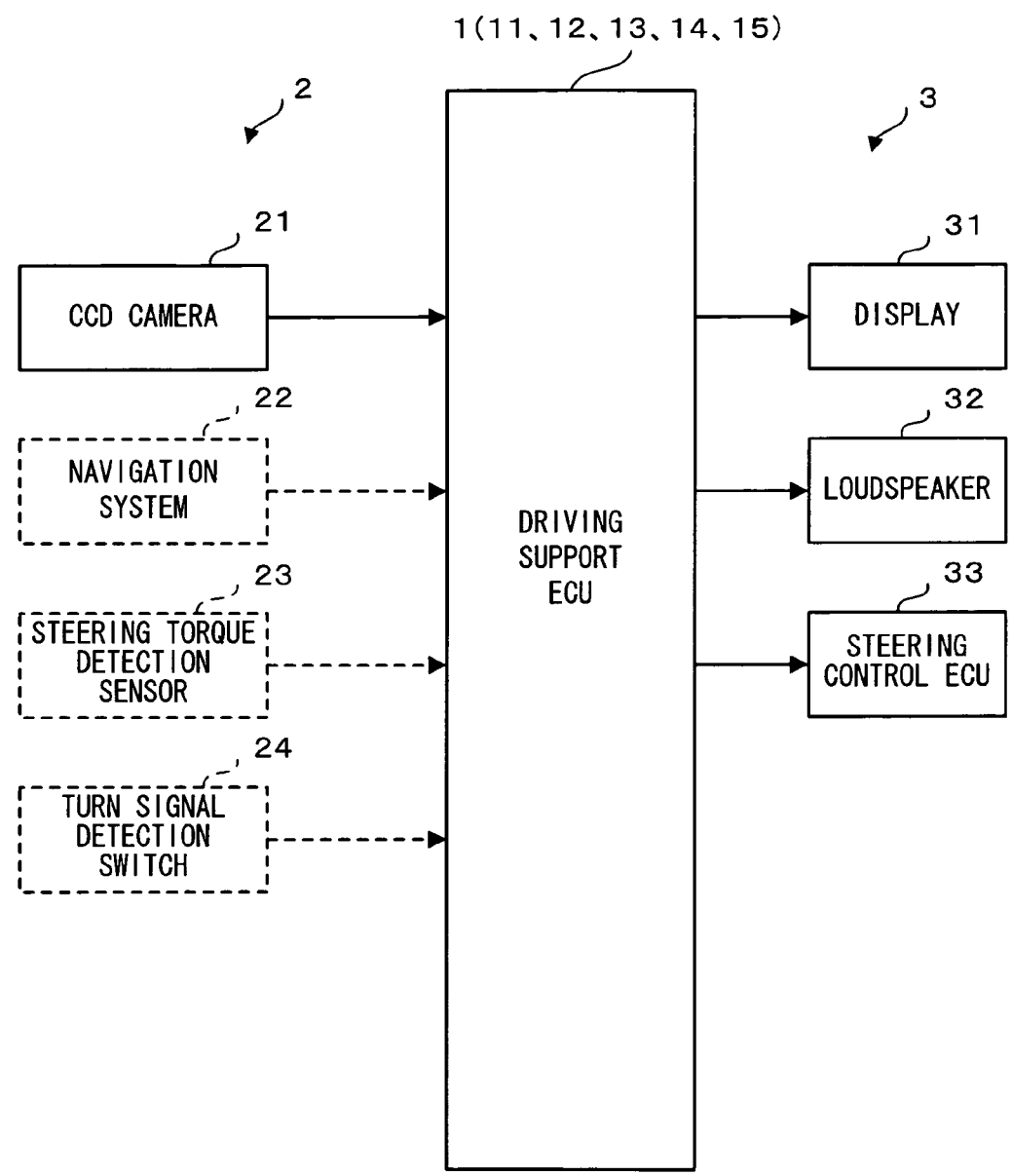
FIG. 1 is a block diagram illustrating one example of a configuration of a driving support apparatus according to the present invention.

FIG. 1 is a block diagram illustrating the one example of the configuration of the driving support apparatus according to the present invention. As shown in FIG. 1, a driving support ECU (Electronic Control Unit) 1 according to the present invention is connected to an input device 2 and an output device 3 as peripheral devices in a communicable manner.

Here, the driving support ECU 1 corresponds to the driving support apparatus. Herein, a case where the driving support apparatus outputs the driving support information for preventing a departure from a lane in which the vehicle is running will be described. In addition, in the below descriptions, in a case where it is not needed to discriminate a driving support ECU 11 through a driving support ECU 15 from one another, the driving support ECU 11 through the driving support ECU 15 are collectively referred to as the driving support ECU 1.

First, with reference to FIG. 1, the input device 2 of the driving support ECU 1 will be described. The input device 2 includes: a CCD camera 21, a navigation system 22, a steering torque detection sensor 23, and a turn signal detection switch 24.

The CCD camera 21 includes a CCD (Charge Coupled Device) and generates information indicating images in front of, on lateral sides, and the like of the vehicle. In addition, the CCD camera 21 outputs the generated image information to the driving support ECU 1 and in the driving support ECU 1, detection of lane markings, a roadside object, and the like is performed based on the image information.

In the below-described first embodiment through fifth embodiment, a case where the driving support ECU 1 (the driving support ECU 11 through the driving support ECU 15) detects the lane markings, the roadside object, and the like based on the image information from the CCD camera 21 will be described. However, the driving support ECU 1 may detect the lane markings, the roadside object, and the like by employing other method. For example, the driving support ECU 1 may detect the roadside object and the like via a radar device. In addition, for example, the driving support ECU 1 may detect the lane markings, the roadside object, and the like based on image information from other type of camera (for example, CMOS (Complementary Metal Oxide Semiconductor) camera).

Here, the "lane marking" is a target for partitioning lanes, and in addition to a white line or the like which is continuously drawn in a form of a line on a road, a white or yellow broken line which is formed to be a line by intermittently allocating broken lines at predetermined regular spacings and connecting the broken lines which are mutually neighboring, Botts' dots (points each having a diameter of approximately 10 cm), a cat's-eyes (reflecting plate), and the like are included. In addition, the "roadside object" is an object installed outside the lane, and a guardrail, a sidewall, a median strip, a curb stone, a roadside tree, and the like are included.

The navigation system 22 is provided with map information, detects a vehicle position, which is a position of a vehicle on a map, via a GPS (Global Positioning System) or the like, and displays the vehicle position on the map on a display. In addition, the navigation system 22 outputs to the driving support ECU 1 the vehicle position information and the map information corresponding the vehicle position.

The steering torque detection sensor 23 detects a steering torque generated when a steering operation is performed via a steering wheel by a driver. In addition, the steering torque detection sensor 23 outputs to the driving support ECU 1 a steering torque signal.

The turn signal detection switch 24 detects a result of an operation of instructing flashing of a turn signal lamp, which is performed via a turn signal lever by the driver. In other words, the turn signal detection switch 24 detects whether or not an operation of instructing the flashing of the turn signal lamp indicating a turn in a right or left direction is performed. In addition, the turn signal detection switch 24 outputs to the driving support ECU 1 a signal (hereinafter, referred to as a "turn signal operation signal") indicating the detected operation of the turn signal lever.

Since the navigation system 22, the steering torque detection sensor 23, and the turn signal detection switch 24 constitute the input device 2 used in a part of the below-described five embodiments, the navigation system 22, the steering torque detection sensor 23, and the turn signal detection switch 24 are shown with broken lines. For example, the navigation system 22 is used in the below-described third, fourth, and fifth embodiments (see FIG. 8, FIG. 11, and FIG. 14).

Next, with reference to FIG. 1, the output device 3 of the driving support ECU 1 will be described. The output device 3 includes a display 31, a loudspeaker 32, and a steering control ECU 33. The display 31 is composed of an LCD (Liquid Crystal Display), which is provided in front of a driving seat, and the like, and displays, in accordance with an instruction from the driving support ECU 1, an image, characters, and the like so as to allow a driver to view the image, the characters, and the like. For example, in a case where the driving support ECU 1 determines that a departure to a right side from a lane in which a vehicle is running is highly likely to occur, based on an instruction from the driving support ECU 1, an alarm screen notifying that the departure to the right side from the lane in which the vehicle is running is to occur is displayed on the display 31.

The loudspeaker 32 is provided, for example, beside the driving seat and outputs, in accordance with an instruction from the driving support ECU 1, to the driver a voice for guidance or the like. For example, in a case where the driving support ECU 1 determines that the departure to the right side from the lane in which the vehicle is running is highly likely to occur, based on an instruction from the driving support ECU 1, alarm information notifying that the departure to the right side from the lane in which the vehicle is running is to occur is outputted from the loudspeaker 32.

The steering control ECU (Electronic Control Unit) 33 controls steering and herein, imparts, in accordance with an instruction from the driving support ECU 1, to the steering wheel a predetermined torque which has been previously set. For example, in a case where the driving support ECU 1 determines that the departure to the right side from the lane in which the vehicle is running is highly likely to occur, based on an instruction from the driving support ECU 1, a torque for prompting the steering wheel to turn to a left side is imparted.

<First Embodiment>

Figure 2:
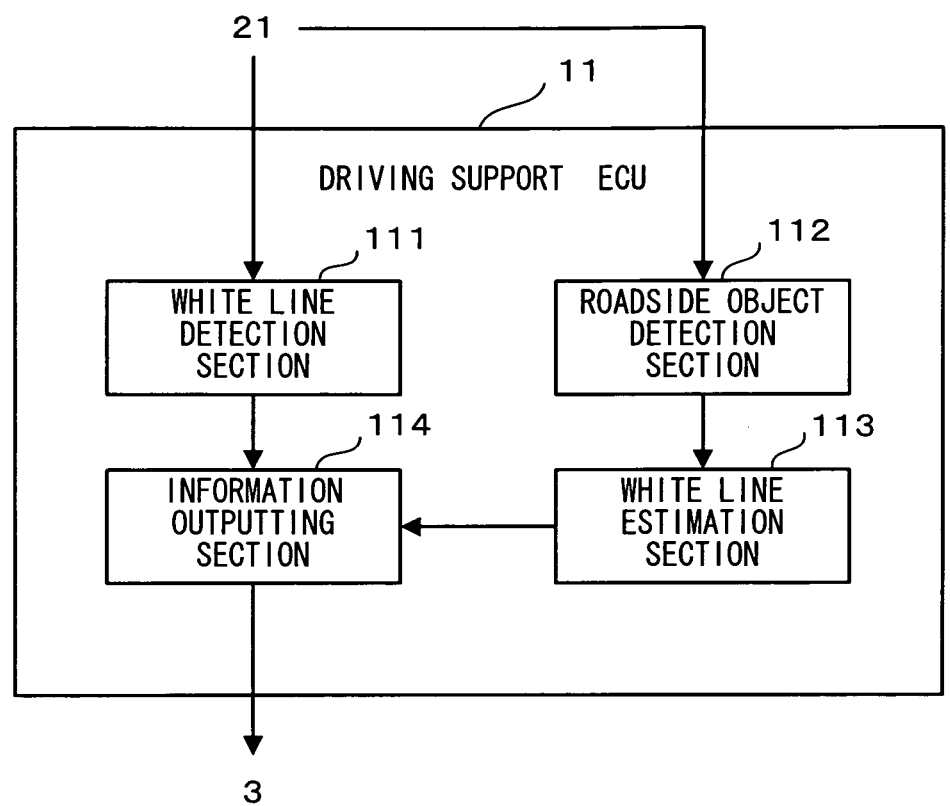
FIG. 2 is a block diagram illustrating one example of a functional configuration of a driving support ECU according to a first embodiment.

FIG. 2 is a block diagram illustrating one example of a functional configuration of a driving support ECU 11 according to a first embodiment. As shown in FIG. 2, the driving support ECU 11 comprises as functional parts: a white line detection section 111; a roadside object detection section 112; a white line estimation section 113; and an information outputting section 114.

The driving support ECU 11 causes a microcomputer provided in an appropriate place of the driving support ECU 11 to execute a control program previously stored in a ROM (Read Only Memory) or the like provided in an appropriate place of the driving support ECU 11, thereby causing the microcomputer to function as the functional parts of the white line detection section 111, the roadside object detection section 112, the white line estimation section 113, the information outputting section 114, and the like. Hereinafter, with reference to FIG. 3, the functional parts of the driving support ECU 11 will be respectively described.

Figure 3:
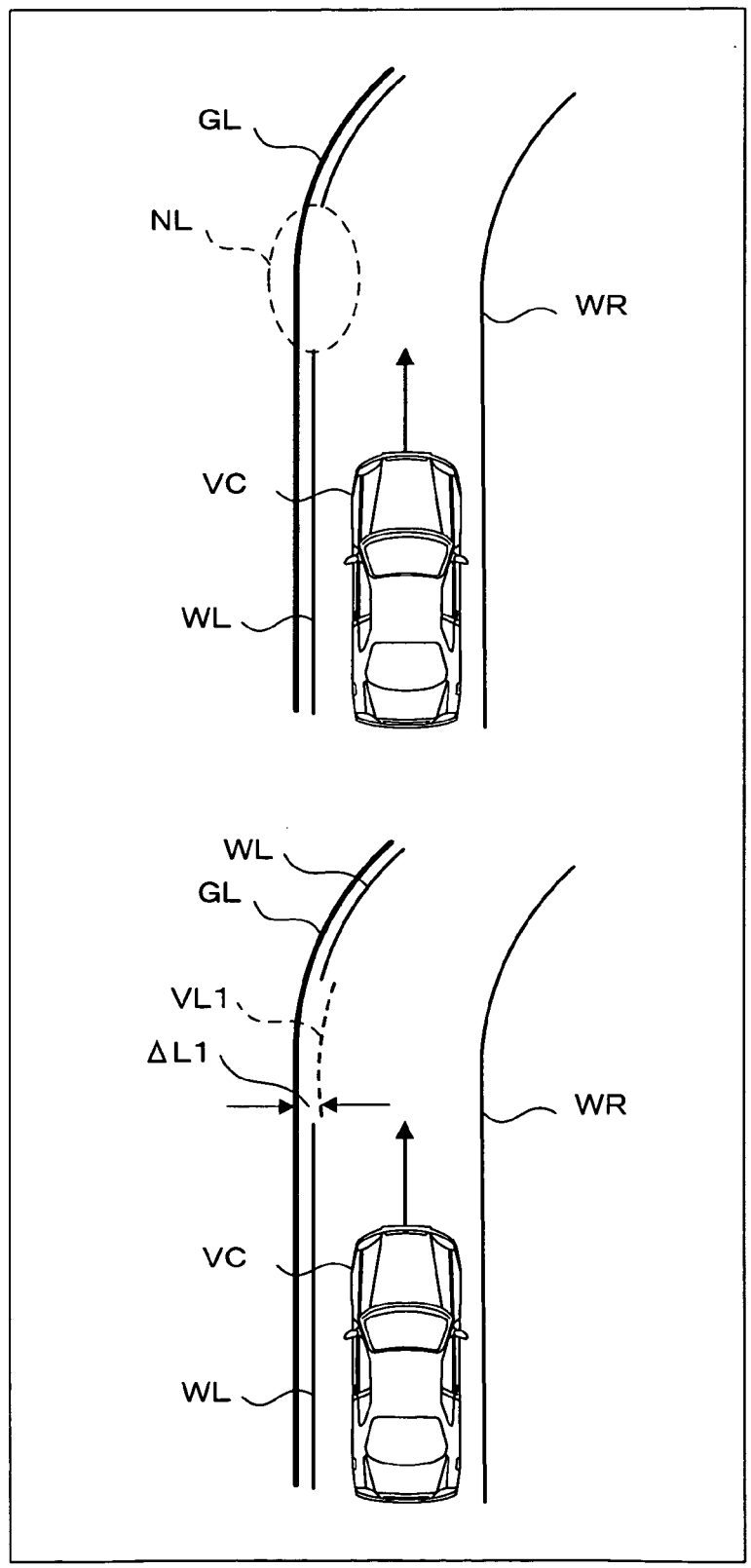
FIG. 3 is a plan view illustrating one example of a situation where a position of a lane marking is estimated by the driving support ECU according to the first embodiment.

FIG. 3 is a plan view illustrating one example of a situation where a position of a lane marking is estimated by the driving support ECU 11 according to the first embodiment. An upper diagram in FIG. 3 is a plan view illustrating one example of a situation where a position of a lane marking VL1 is estimated by the driving support ECU 11, and a lower diagram in FIG. 3 is a plan view showing the position of the lane marking VL1, estimated by the driving support ECU 11. As shown in the upper diagram in FIG. 3, a vehicle VC is running in a direction shown as an upward direction along a lane marked off with lane markings WL and WR. In addition, outside the lane marking WL, a guardrail (namely, a roadside object) GL is installed along the lane marking WL. In a range NL in front of the vehicle VC, a part of the lane marking WL has been erased (or has become blurred).

As shown in the upper diagram in FIG. 3, in a case where the part of the lane marking WL or the lane marking WR has been erased (or has become blurred), it is difficult to properly determine, based on the lane markings WL and WR, a likelihood of a departure from the lane in which the vehicle VC is running. In view of the above-mentioned problem, the driving support ECU 11 according to the first embodiment estimates a position of the lane marking VL1 in the range NL shown in the upper diagram in FIG. 3 based on the roadside object GL as shown in the lower diagram in FIG. 3 and, based on the estimated position of the lane marking VL1, determines the likelihood of the departure from the lane.

The white line detection section 111 is the functional part which detects, based on image information from the CCD camera 21, the lane markings WR and WL installed on right and left sides of the lane in which the vehicle VC is running. Here, the white line detection section 111 corresponds to a white line detection part.

The roadside object detection section 112 is the functional part which, in a case where the lane marking WR on one of the sides is detected by the white line detection section 111 and the lane marking WL on the other of the sides is not detected, detects the roadside object GL on the other of the sides based on the image information from the CCD camera 21. Here, the roadside object detection section 112 corresponds to a roadside object detection part. Specifically, the roadside object detection section 112 detects, among roadside objects on the other of the sides, the roadside object GL installed being in parallel with the one of the lane markings on the one of the right side and the left side or having a substantially same curvature radius as a curvature radius which the one of the lane markings on the one of the right side and the left side has. In other word, the roadside object detection section 112 detects, among the roadside objects on the side on which the lane marking WL is not detected, the roadside object GL installed being in parallel with the one of the lane markings on the one of the right side and the left side, on which the lane marking WR is detected, or having the substantially same curvature radius as the curvature radius which the one of the lane markings on the one of the right side and the left side, on which the lane marking WR is detected, has.

As shown in the upper diagram in FIG. 3, since the roadside object (namely, the guardrail) GL is installed being in parallel with the one of the lane markings on the one of the right side and the left side, on which the lane marking WR is detected, or having the substantially same curvature radius as the curvature radius which the one of the lane markings on the one of the right side and the left side, on which the lane marking WR is detected, has, the roadside object GL is detected as the roadside object used when the white line estimation section 113 estimates the position of the lane marking VL1 which corresponds to the range NL shown in the upper diagram in FIG. 3. In a case where the detected lane marking WR is a straight line, the roadside object detection section 112 detects a roadside object in substantially parallel with the lane marking WR.

As described above, among the roadside objects GL on the side on which the lane marking WL is not detected, the roadside object GL is detected which is installed being in parallel with the one of the lane markings on the one of the right side and the left side, on which the lane marking WR is detected, or having the substantially same curvature radius as the curvature radius which the one of the lane markings on the one of the right side and the left side, on which the lane marking WR is detected, has. Thus, the roadside object GL, such as the guardrail, the median strip, the sidewall, and the curb stone, which is useful for estimating the position of the lane marking VL1 on the side on which the lane marking WL is not detected can be detected.

In the first embodiment, the case where the roadside object GL is detected which is installed being in parallel with the one of the lane markings on the one of the right side and the left side, on which the lane marking WR is detected, or having the substantially same curvature radius as the curvature radius which the one of the lane markings on the one of the right side and the left side, on which the lane marking WR is detected, has is described. However, the roadside object detection section 112 may detect other roadside object in the other manner. For example, the roadside object detection section 112 may detect a roadside object closest to the lane on the side on which the lane marking WL is not detected. In this case, when street trees are planted (or when a pole is installed) along the lane, these street trees (or the pole) can be detected as the roadside object.

The white line estimation section 113 is the functional part which estimates the position of the lane marking VL1 on the other of the sides based on the roadside object GL detected by the roadside object detection section 112. Here, the white line estimation section 113 corresponds to a white line estimation part. Specifically, the white line estimation section 113 estimates, as the position of the lane marking VL1 on the other of the sides, a position which is located at a predetermined first distance $\Delta L1$ inward of the lane, in which the vehicle VC is running, from the position of the roadside object GL detected by the roadside object detection section 112.

As described above, since the position which is located at the predetermined first distance $\Delta L1$ inward of the lane, in which the vehicle VC is running, from the position of the detected roadside object GL is estimated as the position of the lane marking VL1 on the other of the sides, the position of the lane marking VL1 can be further properly estimated by setting the first distance $\Delta L1$ to be a proper value.

For example, a category of the roadside object GL may be judged and based on the judged category of the roadside object GL, a degree of damage caused in a case of a collision with the roadside object GL may be estimated, and a value of the first distance $\Delta L1$ may be set so as to increase in accordance with an increase in the estimated degree of the damage. In this case, since with respect to a roadside object GL having a large degree of the damage caused in a case of the collision, a position of the lane marking VL1 is estimated so as to allow a clearance (that is, a position away from the roadside object GL is estimated), a risk of colliding with the roadside object GL is reduced. Thus, the position of the lane marking VL1 can be further properly estimated.

In the first embodiment, although the case where the position which is located at the first distance $\Delta L1$ inward of the lane from the position of the roadside object GL is estimated as the position of the lane marking VL1 is described, it is only required that the white line estimation section 113 estimates the position of the lane marking VL1 on the other of the sides based on the roadside object GL detected by the roadside object detection section 112. For example, the white line estimation section 113 may estimate the position of the roadside object GL as the position of the lane marking VL1. In this case, processing is simplified. In addition, in a case where a curb stone or the like is installed in the immediate vicinity of the lane marking, a proper position can be estimated as the position of the lane marking VL1.

The information outputting section 114 is the functional part which outputs driving support information based on the position of the lane marking VL1 on the other of the sides, estimated by the white line estimation section 113. Here, the information outputting section 114 corresponds to an information outputting part. Specifically, based on the lane marking WR or WL detected by the white line detection section 111 and the lane marking VL1 estimated by the white line estimation section 113, the information outputting section 114 determines a likelihood of the departure from the lane in which the vehicle VC is running and, in a case where it is determined that the likelihood of the departure is strong, outputs the driving support information (here, alarm or the like) via the output device 3.

Figure 4:
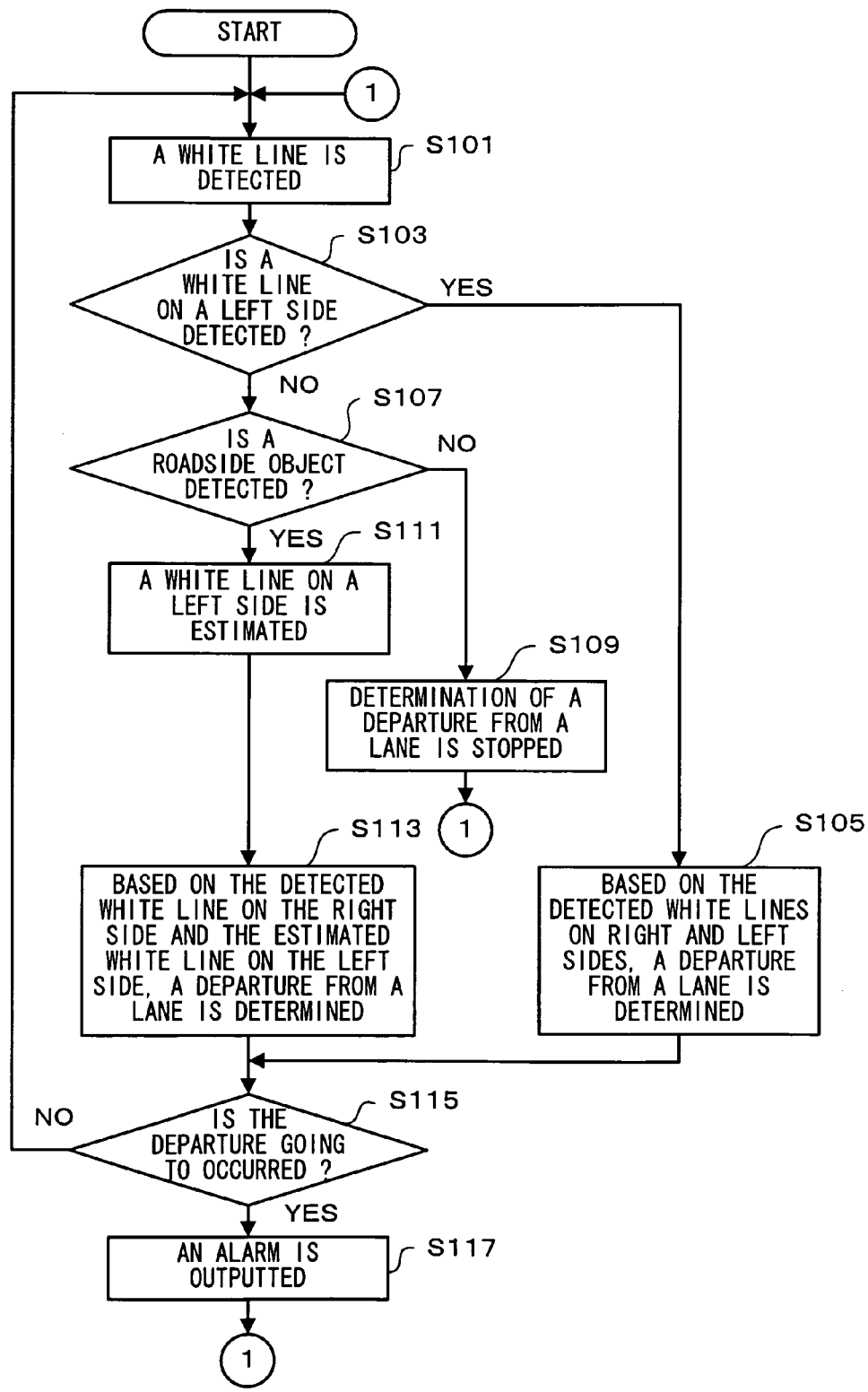
FIG. 4 is a flowchart showing one example of operations of the driving support ECU according to the first embodiment.

FIG. 4 is a flowchart showing one example of operations of the driving support ECU 11 according to the first embodiment. Here, for convenience sake, a case where the lane marking WR installed on the right side of the lane is detected by the white line detection section 111 will be described. In addition, in the flowchart shown in FIG. 4, the "lane marking" is referred to as a "white line" for convenience sake. First, the white line detection section 111 detects the lane markings WR and WL installed on the right and left sides of the lane in which the vehicle VC is running (S101). The roadside object detection section 112 determines whether or not the lane marking WL on the left side is detected (S103).

In a case where it is determined that the lane marking WL on the left side is detected (YES at S103), the information outputting section 114 determines a likelihood of the departure from the lane based on the lane markings WR and WL on the right and left sides, detected at step S101, (S105) and processing proceeds to step S115. In a case where it is determined that the lane marking WL on the left side is not detected (NO at S103), the roadside object detection section 112 determines whether or not the roadside object GL on the side on which the lane marking is not detected (here, the left side) is detected (S107). In a case where it is determined that the roadside object GL is not detected (NO at S107), the determination of the departure from the lane, performed by the information outputting section 114, is stopped (S109), the processing returns to step S101, and the processes at step S101 and the subsequent steps are repeatedly executed.

In a case where it is determined that the roadside object GL is detected (YES at S107), the white line estimation section 113 estimates, based on the detected roadside object GL, a position of the lane marking VL1 on the side (here, the left side) on which the lane marking is not detected at step S101 (S111). Based on the lane marking WR detected at step S101 and the lane marking VL1 estimated at step S111, the information outputting section 114 determines a likelihood of the departure from the lane (S113). When the process at step S105 or step S113 is finished, the information outputting section 114 determines whether or not the likelihood of the departure from the lane is strong (S115). In a case where it is determined that the likelihood of the departure from the lane is strong (YES at S115), the information outputting section 114 outputs the alarm or the like (S117), the processing returns to step S101, and the processes at step S101 and the subsequent steps are repeatedly executed. In a case where it is determined that the likelihood of the departure from the lane is not strong (NO at S115), the processing returns to step S101, and the processes at step S101 and the subsequent steps are repeatedly executed.

As described above, in the case where the lane marking WR on the one of the sides is detected and the lane marking WL on the other of the sides is not detected, the roadside object GL on the other of the sides is detected and based on the detected roadside object GL, the position of the lane marking VL1 on the other of the sides is estimated, thereby allowing the position of the lane marking VL1 to be properly estimated. In addition, based on the properly estimated position of the lane marking VL1, the alarm or the like is outputted, thereby allowing the proper alarm or the like to be outputted.

<Second Embodiment>

Figure 5:
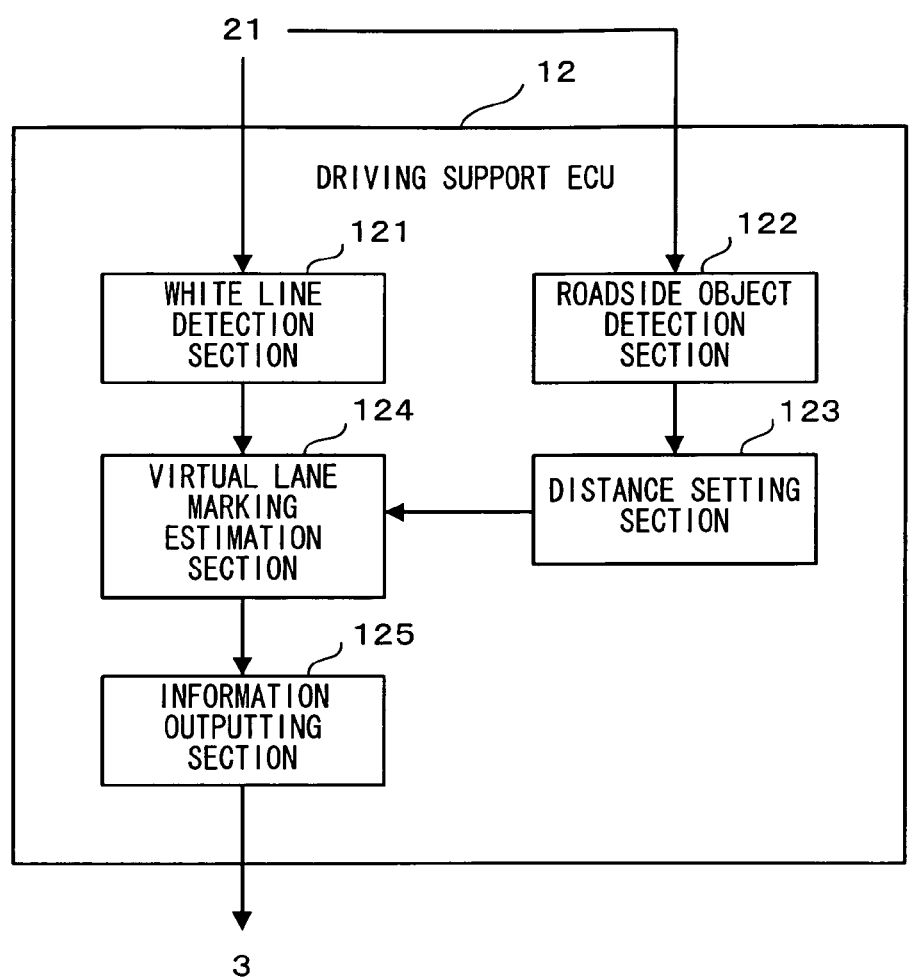
FIG. 5 is a block diagram illustrating one example of a functional configuration of a driving support ECU according to a second embodiment.

FIG. 5 is a block diagram illustrating one example of a functional configuration of a driving support ECU 12 according to a second embodiment. As shown in FIG. 5, the driving support ECU 12 comprises as functional parts: a white line detection section 121; a roadside object detection section 122; a distance setting section 123; a virtual lane marking estimation section 124; and an information outputting section 125.

The driving support ECU 12 causes a microcomputer provided in an appropriate place of the driving support ECU 12 to execute a control program previously stored in a ROM or the like provided in an appropriate place of the driving support ECU 12, thereby causing the microcomputer to function as the functional parts of the white line detection section 121, the roadside object detection section 122, the distance setting section 123, the virtual lane marking estimation section 124, the information outputting section 125, and the like. Hereinafter, with reference to FIG. 6, the functional parts of the driving support ECU 12 will be respectively described.

Figure 6:
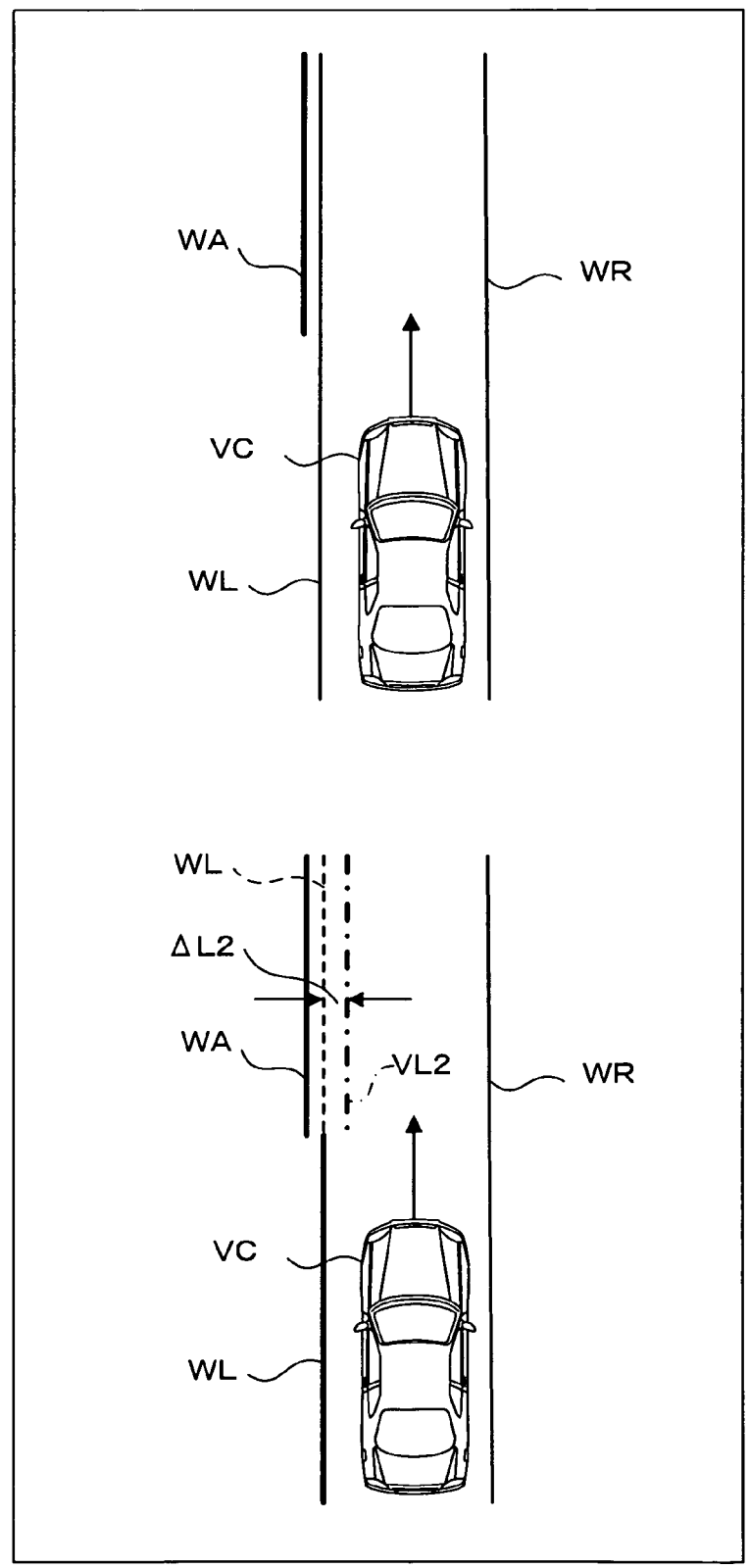
FIG. 6 is a plan view illustrating one example of a situation where a position of a virtual lane marking is estimated by the driving support ECU according to the second embodiment.

FIG. 6 is a plan view illustrating one example of a situation where a position of a virtual lane marking is estimated by the driving support ECU 12 according to the second embodiment. An upper diagram in FIG. 6 is a plan view illustrating one example of a situation where a position of a virtual lane marking VL2 is estimated by the driving support ECU 12, and a lower diagram in FIG. 6 is a plan view showing the position of the virtual lane marking VL2, estimated by the driving support ECU 12. As shown in the upper diagram in FIG. 6, a vehicle VC is running in a direction shown as an upward direction along a lane marked off with lane markings WL and WR. In addition, outside the lane marking WL, a sidewall (namely, a roadside object) WA is installed along the lane marking WL.

As shown in the upper diagram in FIG. 6, in a case where the roadside object WA is installed in the vicinity of the lane marking WL or WR, there may be a case where it is not appropriate to determine, based on the lane marking WL or WR, a likelihood of departure from a lane in which the vehicle VC is running. In view of the above-mentioned problem, the driving support ECU 12 according to the second embodiment estimates, based on the roadside object WA, the position of the virtual lane marking VL2 facing the sidewall (namely, a roadside object) WA as shown in the lower diagram in FIG. 6 and determines, based on the estimated position of the virtual lane marking VL2, the likelihood of departure from the lane.

The white line detection section 121 is the functional part which detects, based on image information from a CCD camera 21, the lane markings WR and WL installed on right and left sides of the lane in which the vehicle VC is running. Here, the white line detection section 121 corresponds to a white line detection part.

The roadside object detection section 122 is the functional part which detects, based on the image information from the CCD camera 21, the roadside objects WA installed on the right and left sides of the lane in which the vehicle VC is running. Here, the roadside object detection section 122 corresponds to a roadside object detection part. In addition, the roadside object detection section 122 judges a category of the detected roadside object WA. Specifically, the roadside object detection section 122 makes the judgment by selecting a category, which corresponds to the roadside object WA, from among categories of a guardrail, a sidewall, a median strip, a curb stone, street trees, and the like, which are previously assumed as roadside objects WA.

The distance setting section 123 is the functional part which sets a second distance $\Delta L2$ which is a distance between the lane marking WL detected by the white line detection section 121 and the virtual lane marking VL2 estimated by the virtual lane marking estimation section 124. Here, the distance setting section 123 corresponds to a distance setting part. Specifically, the distance setting section 123 sets the second distance $\Delta L2$ based on the category of the roadside object WA, judged by the roadside object detection section 122. Here, the distance setting section 123 estimates, based on the category of the roadside object WA judged by the roadside object detection section 122, a degree of damage in a case of a collision with the roadside object WA and sets as the second distance $\Delta L2$ a value whose magnitude increases in accordance with an increase in the estimated degree of damage.

For example, in a case where the roadside object detection section 122 judges the category of the roadside object WA by selecting the corresponding category from among the categories of the sidewall, the guardrail, the median strip, the street trees, and the curb stone, the distance setting section 123 sets the second distance $\Delta L2$ as described below. The distance setting section 123 respectively sets values of the second distance $\Delta L2$ for the sidewall, the guardrail, the median strip, the street trees, and the curb stone so as to decrease a magnitude of each of the values in this order which is decreasing order of the degree of damage in the case of the collision with the roadside object WA. For example, in a case where the roadside object detection section 122 judges the category of the roadside object WA as being each of the sidewall, the guardrail, the median strip, the street trees, and the curb stone, the distance setting section 123 sets the second distance $\Delta L2$ to be 1.0 m, 0.7 m, 0.6 m, 0.5 m, and 0.1 m, respectively.

The virtual lane marking estimation section 124 is the functional part which estimates, based on the lane markings WR and WL detected by the white line detection section 121 and the roadside object WA detected by the roadside object detection section 122, the position of the virtual lane marking VL2 used for outputting driving support information (here, outputting an alarm or the like notifying the departure from the lane). Here, the virtual lane marking estimation section 124 corresponds to a virtual lane marking estimation part. Specifically, in a case where the white line detection section 121 detects the lane marking WR or WL on at least one of the right side and the left side of the lane in which the vehicle is running and the roadside object detection section 122 detects the roadside object WA on the side (here, the left side of the lane) on which the lane marking WR or WL is detected, the virtual lane marking estimation section 124 estimates, as the position of the virtual lane marking VL2, a position which is located at the second distance $\Delta L2$, set by the distance setting section 123, inward of the lane, in which the vehicle VC is running, from the position of the lane marking WL.

As described above, in the case where the roadside object WA is detected on the side on which the lane marking WL is detected, the position which is located at the second distance $\Delta L2$ inward of the lane, in which the vehicle is running, from the position of the lane marking WL is estimated as the position of the virtual lane marking VL2. Therefore, by setting the second distance $\Delta L2$ to be a proper value, the position of the virtual lane marking VL2 can be further properly estimated.

In the second embodiment, the case where the virtual lane marking estimation section 124 estimates, as the position of the virtual lane marking VL2, the position which is located at the second distance $\Delta L2$ inward of the lane from the position of the lane marking WL in the case where the roadside object WA is detected is described. However, it is only required that the virtual lane marking estimation section 124 estimates the position of the virtual lane marking VL2 based on the lane marking WL and the roadside object WA. For example, in a case where the roadside object WA is installed outside the lane marking WL, the virtual lane marking estimation section 124 may estimate a position of the lane marking WL as a position of the virtual lane marking VL2; and in a case where the roadside object WA is installed inside the lane marking WL, the virtual lane marking estimation section 124 may estimate a position of the roadside object WA as a position of the virtual lane marking VL2. In this case, processing is simplified.

In addition, since the category of the roadside object WA is judged and based on the judged category of the roadside object WA, the second distance $\Delta L2$ is set, the second distance $\Delta L2$ can be set to be a proper value, thereby allowing the position of the virtual lane marking VL2 to be further properly estimated.

Furthermore, since with respect to a roadside object WA having a large degree of damage caused in a case of collision, a position of the virtual lane marking VL2 is estimated so as to allow a clearance (that is, a position away from the roadside object WA is estimated), a risk of colliding with the roadside object WA is reduced. Thus, the position of the lane marking VL2 can be further properly estimated.

In the second embodiment, the case where a value of the second distance $\Delta L2$, whose magnitude increases in accordance with the increase in the degree of damage in the case of the collision with the roadside object WA, is set by the distance setting section 123 is described. However, the distance setting section 123 may set the second distance $\Delta L2$ by employing other method. For example, based on a category or the like of the roadside object WA, the distance setting section 123 may estimate a risk in a case where the departure from the lane occurs and may set a value of the second distance $\Delta L2$, whose magnitude increases in accordance with an increase in the estimated risk. For example, since in a case where the roadside object WA is a guardrail which is robustly installed in order to prevent a vehicle from falling off a cliff, a risk incurred in a case where the departure from the lane occurs is great, the second distance $\Delta L2$ is set so as to have a large magnitude.

The information outputting section 125 is the functional part which outputs driving support information based on the position of the virtual lane marking VL2, estimated by the virtual lane marking estimation section 124. Here, the information outputting section 125 corresponds to an information outputting part. Specifically, based on the lane marking WR or WL detected by the white line detection section 111 and the virtual lane marking VL2 estimated by the virtual lane marking estimation section 124, the information outputting section 125 determines a likelihood of the departure from the lane in which the vehicle VC is running, and in a case where it is determined that the likelihood of the departure is strong, the driving support information (here, an alarm or the like) is outputted via the output device 3.

Figure 7:
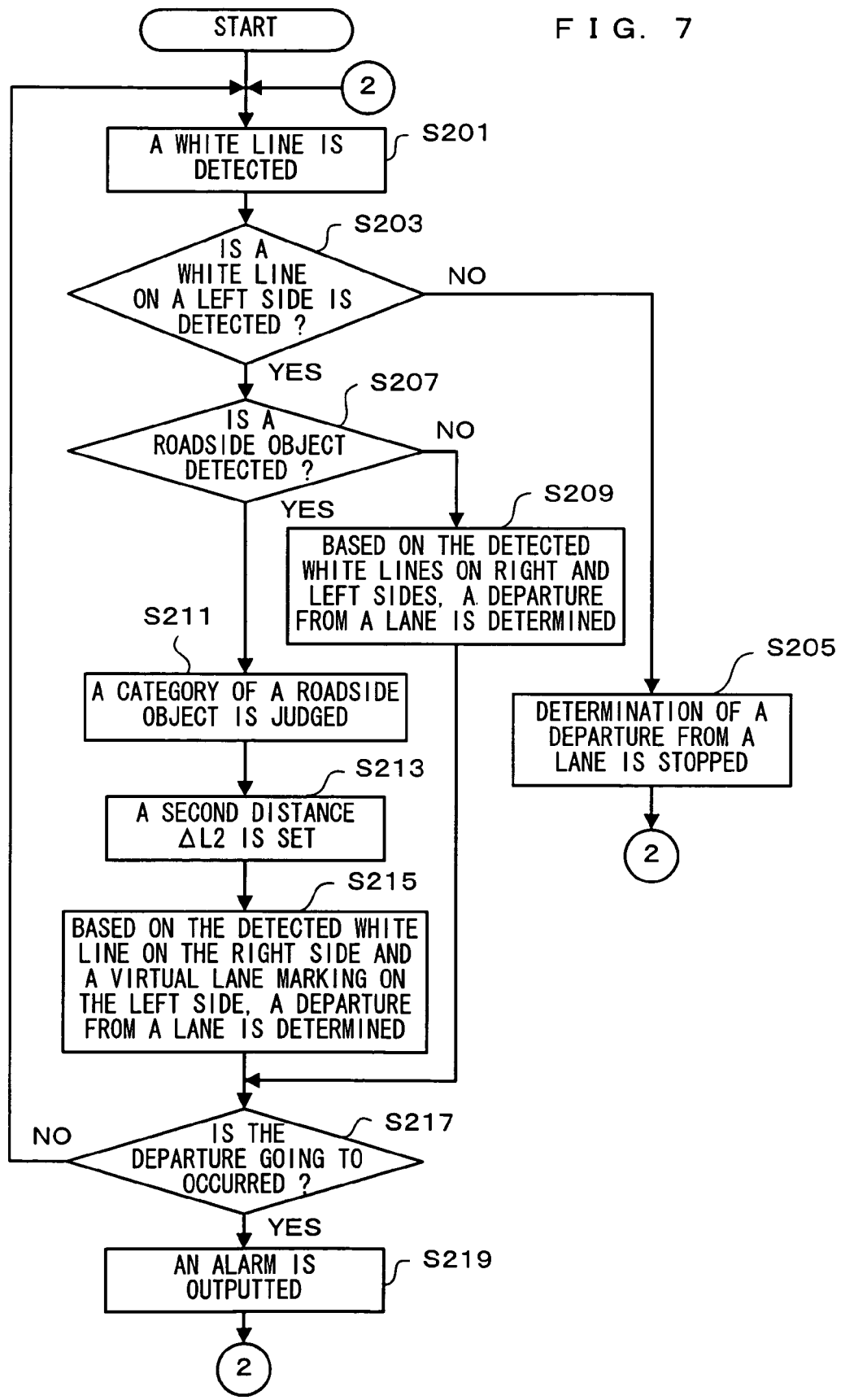
FIG. 7 is a flowchart showing one example of operations of the driving support ECU according to the second embodiment.

FIG. 7 is a flowchart showing one example of operations of the driving support ECU 12 according to the second embodiment. Here, for convenience sake, a case where the lane marking WR installed on the right side of the lane is detected by the white line detection section 111 will be described. In the flowchart shown in FIG. 7, for convenience sake, the "lane marking" is referred to as a "white line". First, the white line detection section 121 detects the lane markings WR and WL installed on the right and left sides of the lane in which the vehicle VC is running (S201). The roadside object detection section 122 determined whether or not the lane marking WL on the left side is detected (S203).

In a case where it is determined that the lane marking WL on the left side is not detected (NO at S203), the determination of the departure from the lane, performed by the information outputting section 125, is stopped (S205), processing returns to step S201, and the processes at step S201 and the subsequent steps are repeatedly executed. In a case where it is determined that the lane marking WL on the left side is determined (YES at S203), the roadside object detection section 122 determines whether or not the roadside object WA on the left side is detected (S207). In a case where it is determined that the roadside object WA is not detected (NO at S207), a likelihood of the departure from the lane is determined based on the lane markings WR and WL on the right and left sides detected at step 201 (S209), the processing proceeds to step S217.

In a case where it is determined that the roadside object WA is detected (YES at S207), the roadside object detection section 122 judges a category of the roadside object WA (S211). Based on the category of the roadside object WA, judged at step S211, the distance setting section 123 sets a second distance ΔL2 (S213). Next, based on the lane marking WL detected at step S201 and the second distance ΔL2 set at step S213, the virtual lane marking estimation section 124 estimates a position of the virtual lane marking VL2 and, based on the estimated virtual lane marking VL2 and the lane marking WR detected at step S201, a likelihood of the departure from the lane is determined (S215).

When the process at step S209 or step S215 is finished, the information outputting section 125 determines whether or not a likelihood of the departure from the lane is strong (S217). In a case where it is determined that a likelihood of the departure from the lane is strong (YES at S217), the information outputting section 125 outputs the alarm or the like (S219), the processing returns to step S201, the processes at step S201 and the subsequent steps are repeated executed. In a case where it is determined that the likelihood of the departure from the lane is not strong (NO at S217), the processing returns to step S201 and the processes at step S201 and the subsequent steps are repeatedly executed.

As described above, since based on the detected lane marking WL and the detected roadside object WA, the position of the virtual lane marking VL2 used for outputting the driving support information is estimated, the position of the virtual lane marking VL2 can be properly estimated. In addition, based on the properly estimated position of the virtual lane marking VL2, the alarm or the like is outputted. Thus, a proper alarm or the like can be outputted.

<Third Embodiment>

Figure 8:
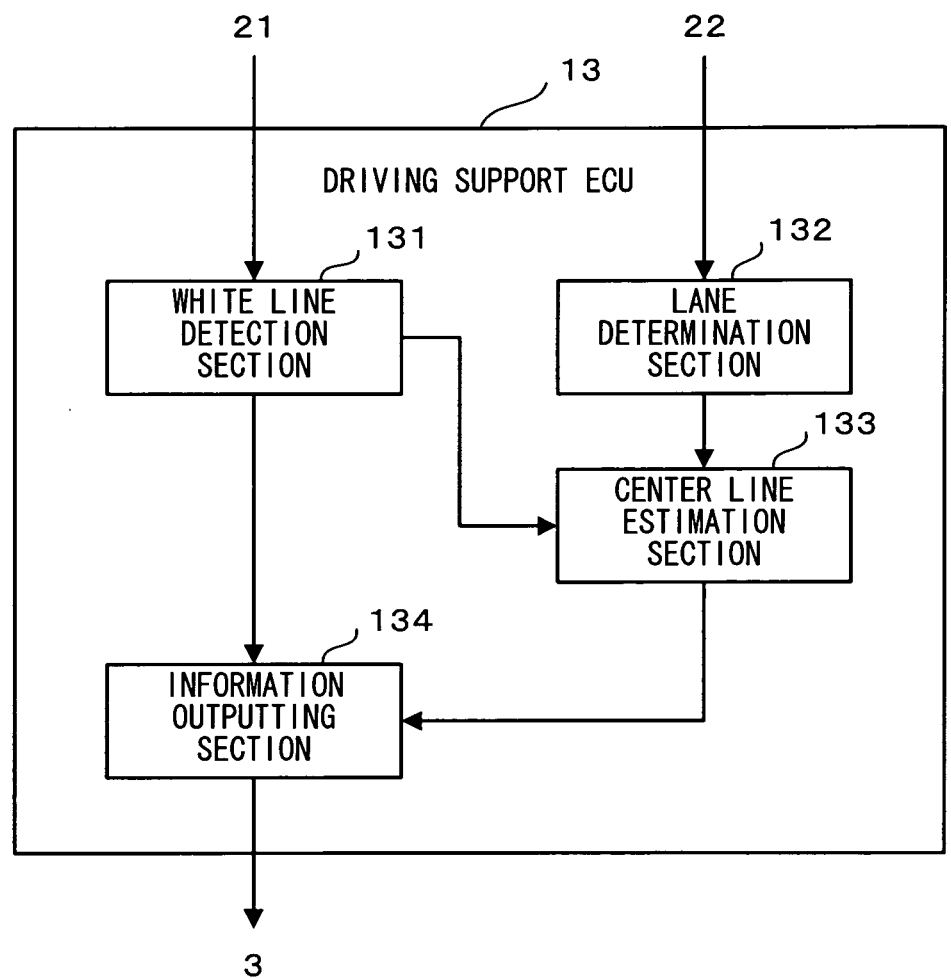
FIG. 8 is a block diagram illustrating one example of a functional configuration of a driving support ECU according to a third embodiment.

FIG. 8 is a block diagram illustrating one example of a functional configuration of a driving support ECU 13 according to a third embodiment. As shown in FIG. 8, the driving support ECU 13 comprises as functional parts: a white line detection section 131; a lane determination section 132; a center line estimation section 133; and an information outputting section 134.

The driving support ECU 13 causes a microcomputer provided in an appropriate place of the driving support ECU 13 to execute a control program previously stored in a ROM or the like provided in an appropriate place of the driving support ECU 13, thereby causing the microcomputer to function as the functional parts of the white line detection section 131, the lane determination section 132, the center line estimation section 133, the information outputting section 134, and the like. Hereinafter, with reference to FIG. 9, the functional parts of the driving support ECU 13 will be respectively described.

Figure 9:
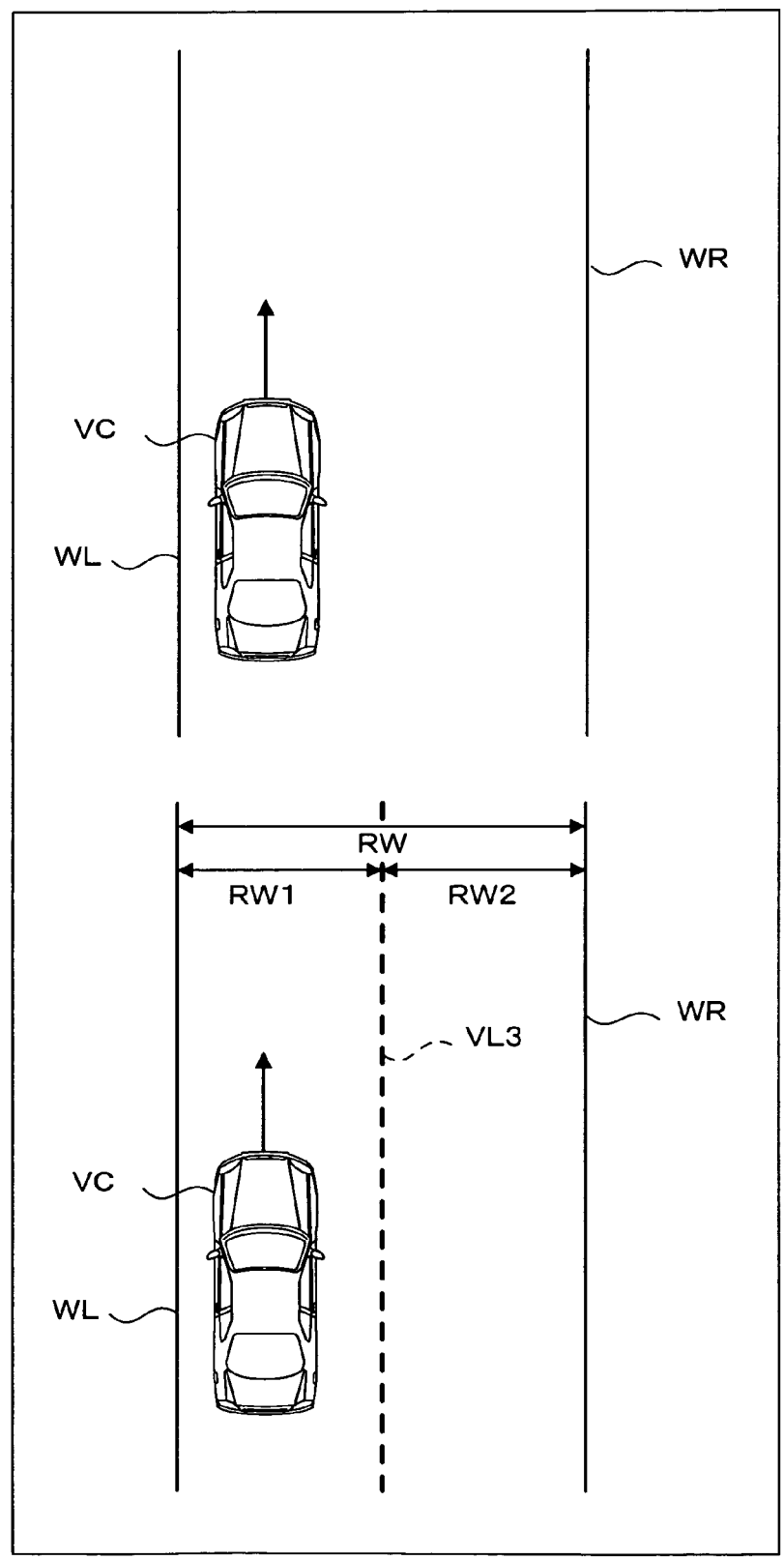
FIG. 9 is a plan view illustrating one example of a situation where a position of a virtual center line is estimated by the driving support ECU according to the third embodiment.

FIG. 9 is a plan view illustrating one example of a situation where a position of a virtual center line is estimated by the driving support ECU 13 according to the third embodiment. An upper diagram in FIG. 9 is a plan view illustrating one example of the situation where a position of a virtual center line VL3 is estimated by the driving support ECU 13, and a lower diagram in FIG. 9 is a plan view showing the position of the virtual center line VL3, estimated by the driving support ECU 13. As shown in the upper diagram in FIG. 9, a vehicle VC is running in a direction shown as an upward direction along a lane which is marked off with lane markings WL and WR and has no center line.

There may be a case where if a likelihood of departure from a lane in which a vehicle is running when running on a road having no center line as shown in the upper diagram in FIG. 9 is estimated, an alarm or the like cannot be properly outputted. In other words, there may be a case where it is preferable to run along the lane marking WL on a left side (or the lane marking WR on a right side) in order to avoid a risk of a collision with an oncoming vehicle. In view of the above-mentioned problem, the driving support ECU 13 according to the third embodiment estimates the position of the virtual center line VL3 based on the lane marking WL or WR as shown in the lower diagram in FIG. 9 and determines, based on the estimated position of the virtual center line VL3, a likelihood of the departure from the lane.

The white line detection section 131 is the functional part which detects, based on image information from a CCD camera 21, the lane markings WR and WL installed on the right and left sides of the lane. Here, the white line detection section 131 corresponds to a white line detection part.

The lane determination section 132 is the functional part which determines, based on information indicating a position of the vehicle VC and map information from the navigation system 22, whether or not a road on which the vehicle VC is running is the road having no center line. Here, the lane determination section 132 corresponds to a lane determination part. Specifically, based on the information indicating the position of the vehicle VC and the map information from the navigation system 22, the lane determination section 132 acquires driving lane information indicating a lane in which the vehicle VC is running and determines, based on the driving lane information, whether or not the road on which the vehicle VC is running have a center line.

The center line estimation section 133 is the functional part which estimates, in a case where the lane determination section 132 determines that the road on which the vehicle VC is running does not have the center line, a position of the virtual center line VL3 based on the lane marking WL and WR detected by the white line detection section 131. Here, the center line estimation section 133 corresponds to a center line estimation part. Specifically, the center line estimation section 133 estimates, as the position of the virtual center line VL3, a substantially center position between the lane markings WL and WR on the both sides, detected by the white line detection section 131.

In other words, as shown in FIG. 9, the center line estimation section 133 estimates the position of the virtual center line VL3 based on a distance RW between the lane marking WL and the lane marking WR such that a distance RW1 from the lane marking WL to the virtual center line VL3 and a distance RW2 from the lane marking WR to the virtual center line VL3 are substantially equal to each other, that is, such that the distance RW1 and the RW2 are substantially ½ of the distance RW.

Since the substantially center position between the detected lane markings WR and WL on the both sides is estimated as the position of the virtual center line VL3, the position of the virtual center line VL3 used for outputting the driving support information can be properly estimated.

In the third embodiment, the case where the center line estimation section 133 estimates as the position of the virtual center line VL3 the substantially center position between the lane markings WL and WR on the both sides is described. However, it is only required that based on the lane markings WL and WR detected by the white line detection section 131, the center line estimation section 133 estimates the position of the virtual center line VL3. For example, the center line estimation section 133 may estimate the position of the virtual center line VL3 based on the distance RW between the lane markings WL and WR on the both sides.

Specifically, for example, in a case where the distance RW is greater than or equal to a predetermined threshold value (for example, 5 m), the center line estimation section 133 may estimate as the position of the virtual center line VL3 a position which is located at a predetermined distance (for example, 2 m) from the lane marking WL on the left side. In addition, in a case where the distance RW is less than the predetermined threshold value (here, 5 m), the center line estimation section 133 may estimate as the position of the virtual center line VL3 the substantially center position between the lane markings WL and WR. In this case, the further proper position can be estimated as the center line VL3.

The information outputting section 134 is the functional part which outputs the driving support information based on the position of the virtual center line VL3, estimated by the center line estimation section 133. Here, the information outputting section 134 corresponds to an information outputting part. Specifically, based on the lane marking WL detected by the white line detection section 131 and the virtual center line VL3 estimated by the center line estimation section 133, the information outputting section 134 determines a likelihood of the departure from the lane in which the vehicle VC is running and outputs, in a case where it is determined that the likelihood of the departure is strong, the driving support information (here, an alarm or the like) via the output device 3.

Figure 10:
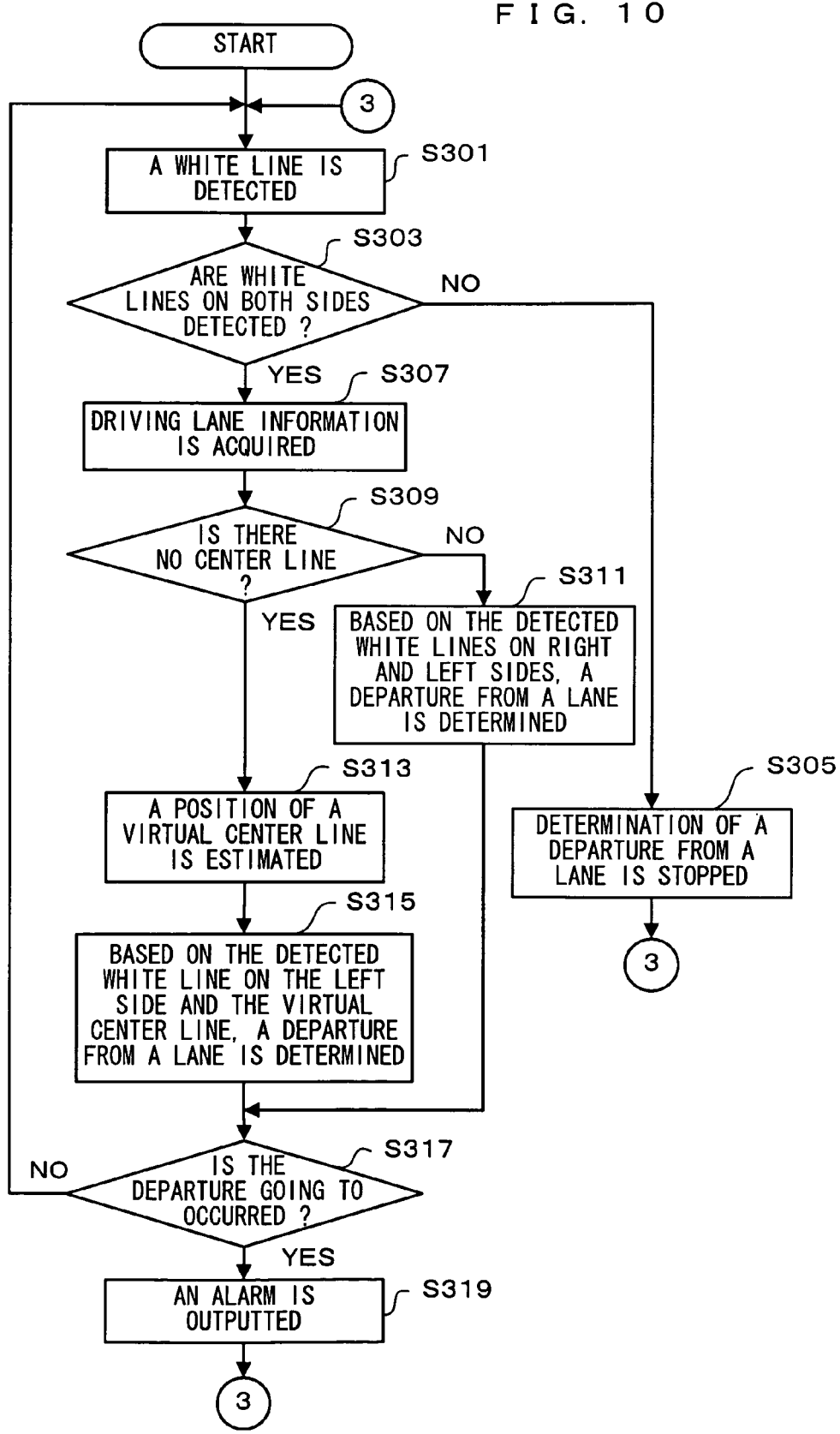
FIG. 10 is a flowchart showing one example of operations of the driving support ECU according to the third embodiment.

FIG. 10 is a flowchart showing one example of operations of the driving support ECU 13 according to the third embodiment. In the flowchart shown in FIG. 10, for convenience sake, the "lane marking" is referred to as a "white line". First, the white line detection section 131 detects the lane markings WR and WL installed on the right and left sides of the lane in which the vehicle VC is running (S301). The lane determination section 132 determines whether or not the lane markings WR and WL on the both sides are detected at step S301 (S303). In a case where it is determined that at least one of the lane markings WR and WL is not detected (NO at S303), the determination of the departure from the lane by the information outputting section 134 is stopped (S305), processing returns to step S301, and the processes at step S301 and the subsequent steps are repeatedly executed.

In a case where it is determined that the lane markings WR and WL on the both sides are detected (YES at S303), the lane determination section 132 acquires the driving lane information from the navigation system 22 (S307). Based on the driving lane information acquired at step S307, the lane determination section 132 determines whether or not the road on which the vehicle VC is running have the center line (S309). In a case where it is determined that the road has the center line (NO at S309), the information outputting section 134 determines the likelihood of the departure from the lane based on the lane markings WR and WL detected at step S301 (S311), and the processing proceeds to step S317.

In a case where it is determined that the road does not have no center line (YES at S309), the center line estimation section 133 estimates the position of the virtual center line VL3 based on the lane markings WR and WL (S313) detected at step S301. Based on the lane marking WL detected at step S301 and the virtual center line VL3 estimated at step S313, the likelihood of the departure from the lane is determined (S315).

When the process at step S311 or step S315 is finished, the information outputting section 134 determines whether or not the likelihood of the departure from the lane is strong (S317). In a case where it is determined that the likelihood of the departure from the lane is strong (YES at S317), the information outputting section 134 outputs the alarm or the like (S319), the processing returns to step S301, and the processes at step S301 and the subsequent steps are repeatedly executed. In a case where it is determined that the likelihood of the departure from the lane is not strong (NO at S317), the processing returns to step S301 and the processes at step S301 and the subsequent steps are repeatedly executed.

As described above, since based on the information indicating the position of the vehicle and the map information, it is determined whether or not the road on which the vehicle VC is running have the center line, whether or not the road has the center line can be properly determined. In addition, since in the case where it is determined that the road does not have the center line, the position of the virtual center line VL3 is estimated based on the detected lane markings WR and WL, the proper position of the virtual center line VL3 can be estimated. Furthermore, since based on the proper position estimated as the position of the virtual center line VL3, the alarm or the like is outputted, the proper alarm or the like can be outputted.

<Fourth Embodiment>

Figure 11:
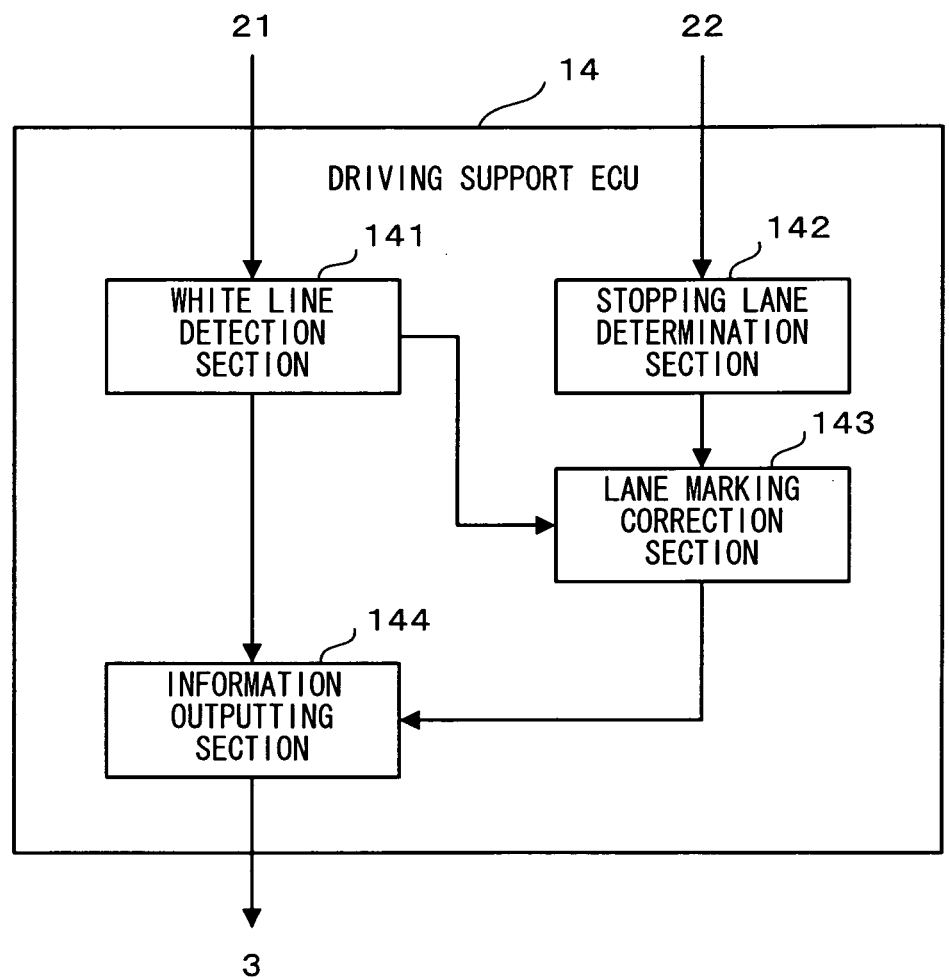
FIG. 11 is a block diagram illustrating one example of a functional configuration of a driving support ECU according to a fourth embodiment.

FIG. 11 is a block diagram illustrating one example of a functional configuration of a driving support ECU 14 according to a fourth embodiment. As shown in FIG. 11, the driving support ECU 14 comprises as functional parts: a white line detection section 141; a stopping lane determination section 142; a lane marking correction section 143; and an information outputting section 144.

The driving support ECU 14 causes a microcomputer provided in an appropriate place of the driving support ECU 14 to execute a control program previously stored in a ROM or the like provided in an appropriate place of the driving support ECU 14, thereby causing the microcomputer to function as the functional parts of the white line detection section 141, the stopping lane determination section 142, the lane marking correction section 143, the information outputting section 144, and the like. Hereinafter, with reference to FIG. 12, the functional parts of the driving support ECU 14 will be respectively described.

Figure 12:
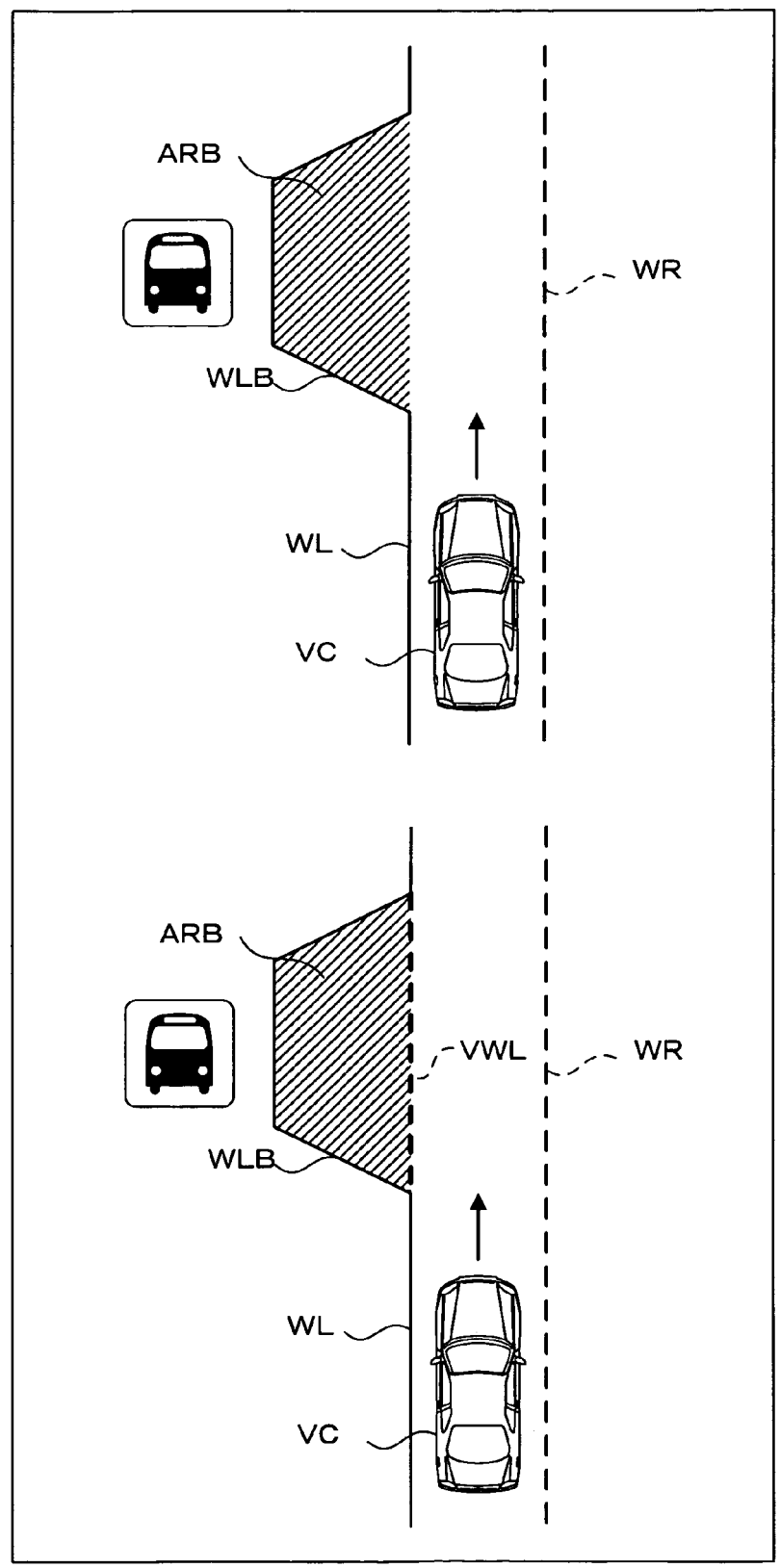
FIG. 12 is a plan view illustrating one example of a situation where a position of a lane marking is corrected by the driving support ECU according to the fourth embodiment.

FIG. 12 is a plan view illustrating one example of a situation where a position of a lane marking is corrected by the driving support ECU 14 according to the fourth embodiment. An upper diagram in FIG. 12 is a plan view illustrating one example of the situation where a position of a lane marking WLB is corrected by the driving support ECU 14, and a lower diagram in FIG. 12 is a plan view showing a position of a lane marking VWL, corrected by the driving support ECU 14. As shown in the upper diagram in FIG. 12, a vehicle VC is running in a direction shown as an upward direction along the lane having no center line, marked off with the lane markings WR and WL.

As shown in FIG. 12, since in a vehicle stopping bay ARB such as a bus bay, the lane marking WL on the left side is shifted outward of the lane by a width of a stopping lane, if a likelihood of a departure from the lane is determined based on the lane markings WR and WL, there may be a case where an alarm or the like cannot be properly outputted. In other words, in a case where the vehicle stopping bay ARB such as the bus bay is installed, there may be a case where it is not preferable to run along the lane marking WL on the left side (or the lane marking WR on the right side). In view of the above-mentioned problem, the driving support ECU 14 according to the fourth embodiment corrects the position of the lane marking WLB to the position of the lane marking VWL as shown in the lower diagram in FIG. 12 and determines, based on the corrected the lane marking VWL, the likelihood of the departure from the lane.

The white line detection section 141 is the functional part which detects, based on image information from the CCD camera 21, the lane markings WR and WL installed on the right and left sides of the lane in which a vehicle VC is running. Here, the white line detection section 141 corresponds to a white line detection part.

The stopping lane determination section 142 is the functional part which determines, based on information indicating a position of the vehicle VC and map information from the navigation system 22, whether or not there is a vehicle stopping bay ARB, whose lane marking is shifted outward by a predetermined width of a stopping lane, in front of the vehicle VC. Here, the stopping lane determination section 142 corresponds to a stopping lane determination part. Specifically, the stopping lane determination section 142 acquires, from the navigation system 22, stopping lane information indicating a vehicle stopping bay installed beside the lane in which the vehicle VC is running and determines, based on the stopping lane information, whether or not there is the vehicle stopping bay ARB in front of the vehicle VC. As the vehicle stopping bay ARB, the bus bay shown in FIG. 12, a waiting place which is installed in an expressway or the like and where an accident car waits, and the like are included. In the fourth embodiment, a case where the vehicle stopping bay ARB is the bus bay will be described.

The lane marking correction section 143 is the functional part which corrects, in a case where the stopping lane determination section 142 determines that there is the vehicle stopping bay ARB, a position of the lane marking WL on a side on which the vehicle stopping bay ARB is installed, based on the lane markings WR and WL detected by the white line detection section 141. Here, the lane marking correction section 143 corresponds to a lane marking correction part. In other words, the lane marking correction section 143 is the functional part which obtains a position of the lane marking VWL, which has been corrected.

Specifically, based on the position of the lane marking WL installed behind the vehicle stopping bay ARB and the position of the lane marking WR on a side where the vehicle stopping bay ARB is not installed, the lane marking correction section 143 corrects the position of the lane marking WL on the side where the vehicle stopping bay ARB is installed. For example, as shown in the lower diagram in FIG. 12, the lane marking correction section 143 obtains the position of the lane marking VWL, which has been corrected, by extending the lane marking VWL, with the position of the lane marking WL installed behind the vehicle stopping bay ARB as a starting point, so as to be in parallel with the lane marking WR.

As described above, based on the position of the lane marking WL installed behind the vehicle stopping bay ARB and the position of the lane marking WR on the side where the vehicle stopping bay ARB is not installed, the position of the lane marking WL on the side where the vehicle stopping bay ARB is installed can be corrected (that is, the proper position of the lane marking VWL, which has been corrected, can be obtained).

In the fourth embodiment, the case where the lane marking correction section 143 obtains the position of the lane marking VWL, which has been corrected, based on the position of the lane marking WL installed behind the vehicle stopping bay ARB and the position of the lane marking WR is described. However, it is only required that the position of the lane marking VWL, which has been corrected, is obtained based on at least one of the position of the lane marking WL installed behind the vehicle stopping bay ARB and the position of the lane marking WR. For example, based on the position of the lane marking WL installed behind the vehicle stopping bay ARB, the lane marking correction section 143 may obtain the position of the lane marking VWL, which has been corrected. Specifically, for example, the lane marking correction section 143 may obtain the position of the lane marking VWL, which has been corrected, by extending the lane marking WL with the position of the lane marking WL installed behind the vehicle stopping bay ARB as the starting point.

The information outputting section 144 is the functional part which outputs the driving support information based on the position of the lane marking VWL, corrected by the lane marking correction section 143. Here, the information outputting section 144 corresponds to an information outputting part. Specifically, based on the lane markings WR and WL detected by the white line detection section 141 and the lane marking VWL corrected by the lane marking correction section 143, the information outputting section 144 determines the likelihood of the departure from the lane in which the vehicle VC is running and outputs the driving support information (here, the alarm or the like) via the output device 3 in the case where it is determined that the likelihood of the departure is strong.

Figure 13:
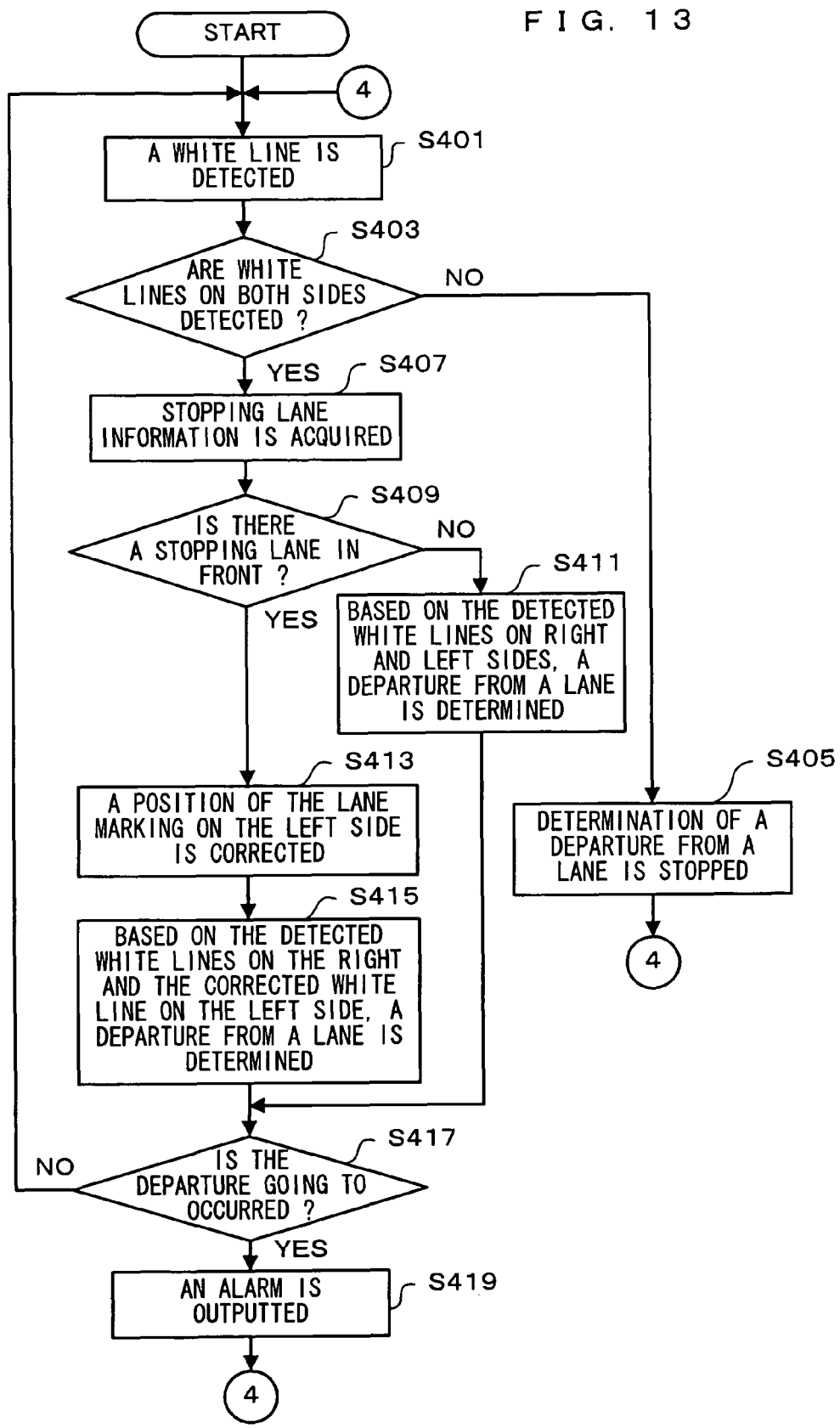
FIG. 13 is a flowchart showing one example of operations of the driving support ECU according to the fourth embodiment.

FIG. 13 is a flowchart showing one example of operations of the driving support ECU 14 according to the fourth embodiment. In the flowchart shown in FIG. 13, for convenience sake, the "lane marking" is referred to as a "white line". First, the white line detection section 141 detects the lane markings WR and WL installed on the right and left sides of the lane in which the vehicle VC is running (S401). The stopping lane determination section 142 determines whether or not the lane markings WR and WL on the both sides are detected at step S401 (S403). In a case where at least one of the lane markings WR and WL is not detected (NO at S403), the determination of the departure from the lane by the information outputting section 144 is stopped (S405), the processing returns to step S401, and the processes at step S401 and the subsequent steps are repeatedly executed.

In a case where it is determined that the lane markings WR and WL on the both sides are detected (YES at S403), the stopping lane determination section 142 acquires stopping lane information from the navigation system 22 (S407). Based on the stopping lane information acquired at step S407, the stopping lane determination section 142 determines whether or not there is the vehicle stopping bay ARB in front of the vehicle VC (S409). In a case where it is determined that there is no vehicle stopping bay ARB (NO at S409), the information outputting section 144 determines the likelihood of the departure from the lane based on the lane markings WR and WL detected at step S401 (S411) and processing proceeds to step S417.

In a case where it is determined that there is the vehicle stopping bay ARB (YES at S409), the lane marking correction section 143 corrects, based on the lane markings WR and WL detected at step S401, the position of the lane marking WL on the side where the vehicle stopping bay ARB is installed and obtains the corrected position of the lane marking VWL (S413). Based on the lane marking WR detected at step S401 and the lane marking VWL corrected at step S413, the likelihood of the departure from the lane is determined (S415).

When the process at step S411 or step S415 is finished, the information outputting section 144 determines whether or not the likelihood of the departure from the lane is strong (S417). In a case where it is determined that the likelihood of the departure from the lane is strong (YES at S417), the information outputting section 144 outputs the alarm or the like (S419), the processing returns to step S401, and the processes at step S401 and the subsequent processes are repeatedly executed. In a case where it is determined that the likelihood of the departure from the lane is not strong (NO at S417), the processing returns to step S401 and the processes at step S401 and the subsequent steps are repeatedly executed.

As described above, since based on the information indicating the position of the vehicle VC and the map information, it is determined whether or not there is the vehicle stopping bay ARB, whose lane marking is shifted outward by the width of the stopping lane, in front of the vehicle VC, it can be properly determined whether or not there is the vehicle stopping bay ARB. In addition, since in the case where it is determined that there is the vehicle stopping bay ARB, the position of the lane marking WL on the side where the vehicle stopping bay ARB is installed is corrected based on the detected lane markings WR and WL, the position of the lane marking WL can be properly corrected. Furthermore, since based on the corrected position of the lane marking VWL, the alarm or the like is outputted, the proper alarm or the like can be outputted.

<Fifth Embodiment>

Figure 14:
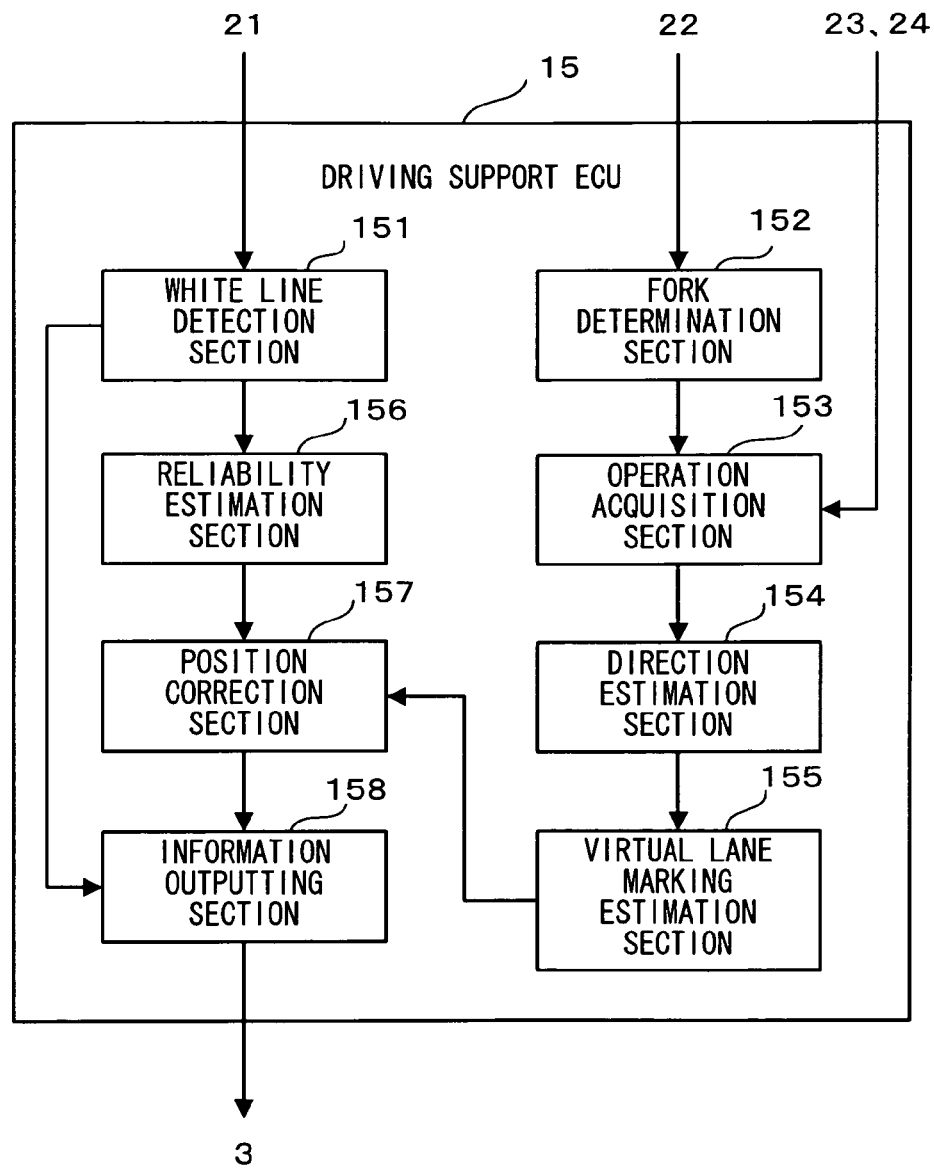
FIG. 14 is a block diagram illustrating one example of a functional configuration of a driving support ECU according to a fifth embodiment.

FIG. 14 is a block diagram illustrating one example of a functional configuration of a driving support ECU 15 according to a fifth embodiment. As shown in FIG. 14, the driving support ECU 15 comprises as functional parts: a white line detection section 151; a fork determination section 152; an operation acquisition section 153; a direction estimation section 154; a virtual lane marking estimation section 155; a reliability estimation section 156; a position correction section 157; and an information outputting section 158.

Figure 15:
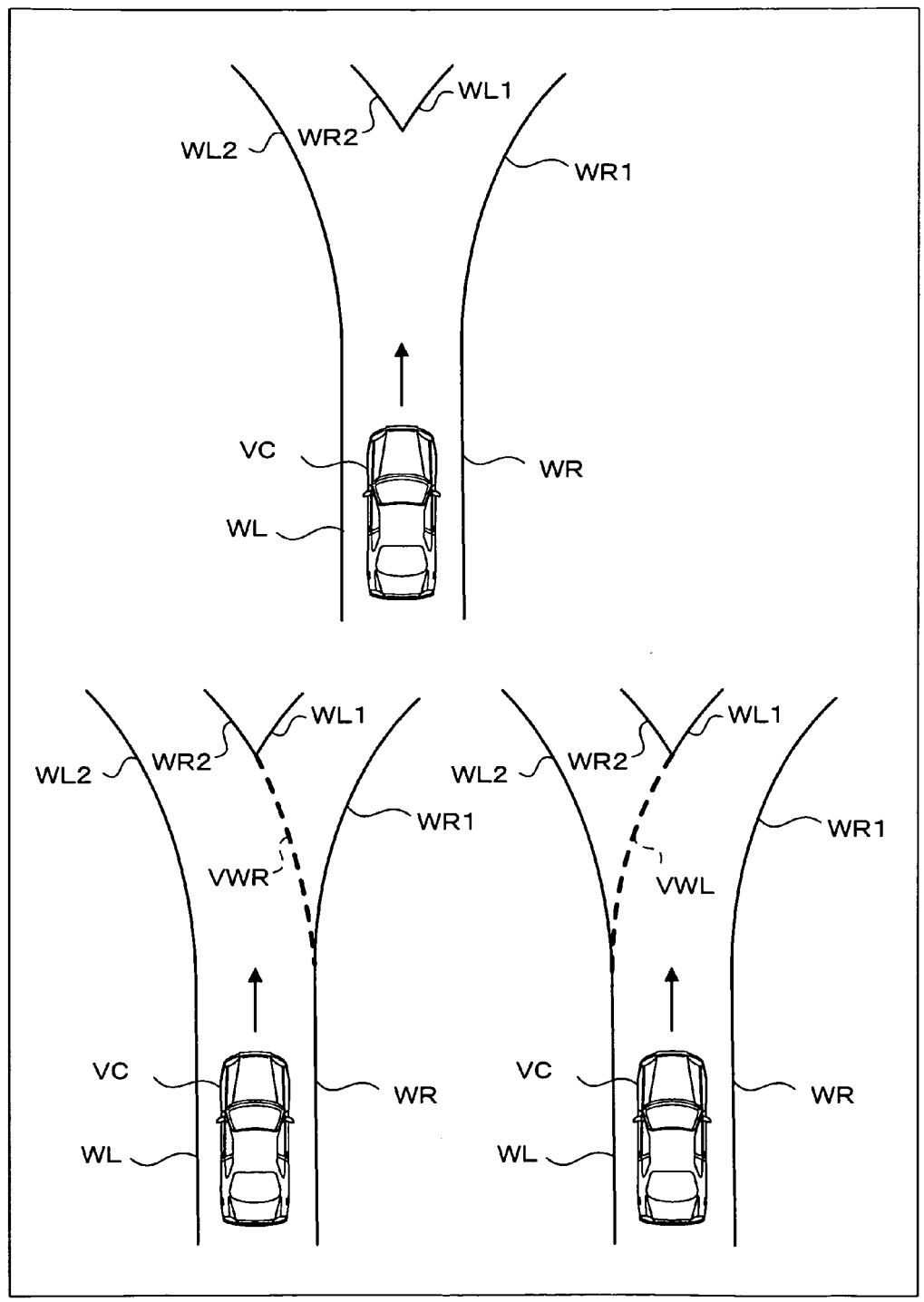
FIG. 15 is a plan view illustrating one example of a situation where a position of a virtual lane marking is estimated by the driving support ECU according to the fifth embodiment.
Figure 16:
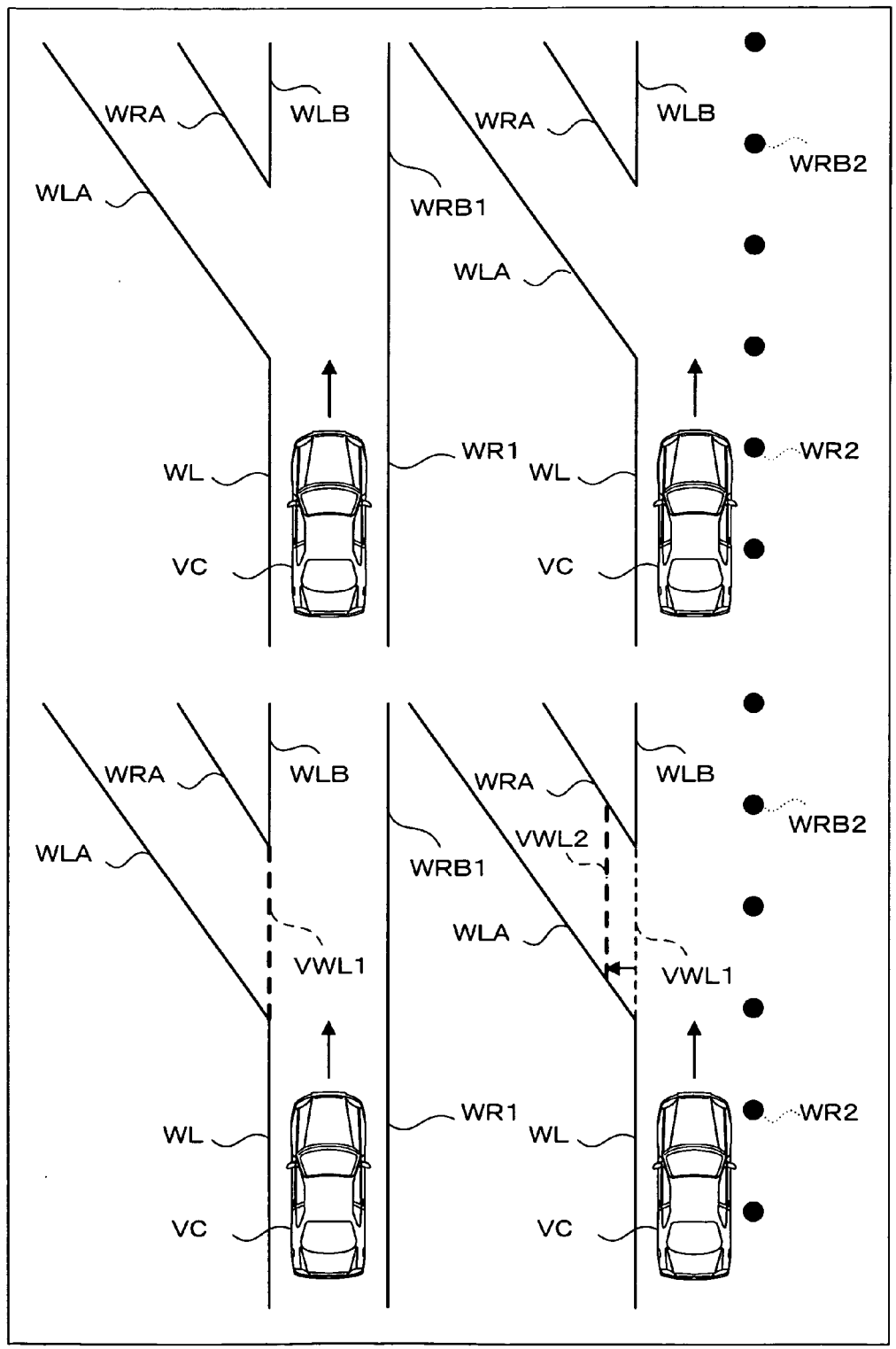
FIG. 16 is a plan view illustrating one example of a situation where the position of the virtual lane marking is corrected by the driving support ECU according to the fifth embodiment.

The driving support ECU 15 causes a microcomputer provided in an appropriate place of the driving support ECU 15 to execute a control program previously stored in a ROM or the like provided in an appropriate place of the driving support ECU 15, thereby causing the microcomputer to function as the functional parts of the white line detection section 151, the fork determination section 152, the operation acquisition section 153, the direction estimation section 154, the virtual lane marking estimation section 155, the reliability estimation section 156, the position correction section 157, the information outputting section 158, and the like. Hereinafter, with reference to FIG. 15 and FIG. 16, the functional parts of the driving support ECU 15 will be respectively described FIG. 15 and FIG. 16 are plan views illustrating one example of a situation where positions of virtual lane markings are estimated by the driving support ECU 15 according to the fifth embodiment. An upper diagram in FIG. 15 is a plan view illustrating the one example of the situation where the positions of the virtual lane markings VWR and VWL are estimated by the driving support ECU 15, and a lower diagram in FIG. 15 is a plan view showing the positions of the virtual lane markings VWR and VWL, estimated by the driving support ECU 15. As shown in the upper diagram in FIG. 15, a vehicle VC is running in a direction shown as an upward direction along a lane marked off with lane markings WR and WL and a fork is present in front.

An upper diagram in FIG. 16 is a plan view illustrating one example of a situation where positions of virtual lane markings VWL1 and VWL2 are estimated by the driving support ECU 15, and a lower diagram in FIG. 16 is a plan view showing the positions of the virtual lane markings VWL1 and VWL2, estimated by the driving support ECU 15. As shown in the upper diagram in FIG. 16, the vehicle VC is running in a direction shown as an upward direction along the lane marked off with the lane markings WL and WR1 (or the lane markings WL and WR2) and a fork spot is present in front. Views on left sides and views on right sides in FIG. 16 are different in categories of the lane markings WR1 and WR2 on the right sides. In other words, the lane markings WR1 on the right sides in the views on the left sides in FIG. 16 are solid white lines and the lane markings WR2 on the right sides in the views on the right side in FIG. 16 are Botts' dots.

As shown in each of the upper diagrams in FIG. 15 and FIG. 16, since there is no lane marking on the left side or the right side at the fork spot, a likelihood of a departure from the lane in which the vehicle VC is running cannot be estimated (or it is difficult to estimate the likelihood). In view of the above-mentioned problem, the driving support ECU 15 according to the fifth embodiment generates virtual lane markings VWR, VWL, VWL1, and VWL2 at the fork and determines the likelihood of the departure from the lane based on positions of the generated virtual lane markings VWR, VWL, VWL1, and VWL2.

The white line detection section 151 is the functional part which detects, based on image information from the CCD camera 21, the lane markings WR and WL installed on the right and left sides of the lane in which the vehicle VC is running. Here, the white line detection section 151 corresponds to a white line detection part.

The fork determination section 152 is the functional part which determines, based on information indicating a position of the vehicle VC and map information from the navigation system 22, whether or not there is a fork spot in a road, on which the vehicle VC is running, in front of the vehicle VC. Here, the fork determination section 152 corresponds to a fork determination part. In addition, the "fork spot" is a spot at which a traveling direction of a road forks in two directions, such as spots at a junction of an expressway, an exit from an expressway to a general road, an entrance from an expressway to a service area or the like. Further, specifically, the fork determination section 152 acquires fork information indicating the fork spot from the navigation system 22 and determines, based on the acquired fork information, whether or not there is the fork spot in the road in front of the vehicle VC.

The operation acquisition section 153 is the functional part which acquires operation information indicating information of an operation performed by a driver. Here, the operation acquisition section 153 corresponds to an operation acquisition part. Specifically, the operation acquisition section 153 acquires, via a steering torque detection sensor 23 and a turn signal detection switch 24, steering torque information and turn signal operation information generated by the operation performed by the driver.

The direction estimation section 154 is the functional part which estimates, based on the operation information (here, the steering torque information and the turn signal operation information), a traveling direction of the vehicle VC at the fork spot in the road. Here, the direction estimation section 154 corresponds to a direction estimation part. Specifically, the direction estimation section 154 determines, based on the turn signal operation information, whether or not a turn signal operation is performed, and estimates, in a case where the turn signal operation is performed, that the vehicle VC travels in a direction in accordance with the turn signal operation. In a case where the turn signal operation is not performed, the direction estimation section 154 determines whether or not an absolute value of a steering torque TR acquired by the operation acquisition section 153 is greater than or equal to a threshold value TSH (for example, 1.5 Nm) for determining whether or not an intentional steering operation is performed and estimates, in a case where the absolute value is greater than or equal to the determination threshold value TSH, a traveling direction of the vehicle VC based on a direction of the steering torque (that is, based on whether the steering torque TR is positive or negative).

As described above, based on the steering torque information and the turn signal operation information, the traveling direction of the vehicle VC at the fork spot in the road can be accurately estimated.

In the fifth embodiment, the case where based on the operation information acquired by the operation acquisition section 153, the direction estimation section 154 estimates the traveling direction of the vehicle VC at the fork spot in the road is described. However, the direction estimation section 154 may estimate the traveling direction of the vehicle VC at the fork spot in the road by employing other method. For example, based on one of the steering torque information and the turn signal operation information, the direction estimation section 154 may estimate the traveling direction of the vehicle VC at the fork spot in the road. In this case, processing is simplified.

In addition, for example, based on routing assistance information from the navigation system 22, the direction estimation section 154 may estimate the traveling direction of the vehicle VC at the fork spot in the road. In a case where a driver sets a destination or the like in the navigation system 22 and sets the routing assistance information for heading for the destination to be outputted, it is often the case that an operation is performed based on the routing assistance information from the navigation system 22 (that is, it is often the case that the vehicle VC heads in a direction indicated by the routing assistance information). Accordingly, in this case, the direction estimation section 154 having a simple configuration can accurately estimate the traveling direction of the vehicle VC.

The virtual lane marking estimation section 155 is the functional part which generates the virtual lane markings VWL, VWR, and VWL1 used for determining, in a case where the fork determination section 152 determines that there is the fork spot in the road, the likelihood of the departure from the lane at the fork spot, so as to traverse a forked road in a direction which is not the traveling direction estimated by the direction estimation section 154. Here, the virtual lane marking estimation section 155 corresponds to a virtual lane marking estimation part.

For example, in a case where the vehicle VC heads toward a right side of the forked road in a situation shown in FIG. 15, as shown in the lower diagram on a right side in FIG. 15, the virtual lane marking estimation section 155 generates a virtual lane marking VWL so as to traverse the forked road on a left side in a direction which is not the traveling direction. In addition, in a case where the vehicle VC heads toward a left side of the forked road, as shown in the lower diagram on a left side in FIG. 15, the virtual lane marking estimation section 155 generates a virtual lane marking VWR so as to traverse the forked road on a right side in a direction which is not the traveling direction. Further, in a case where the vehicle heads straight in a situation shown in FIG. 16 (that is, in a case where the vehicle VC heads toward a right side of the forked road), as shown in the lower diagram in FIG. 16, a virtual lane marking VWL1 is generated so as to traverse the forked road on a left side in a direction which is not the traveling direction.

In addition, in a case where the direction estimation section 154 determines that the vehicle VC heads toward the right side of the forked road, the virtual lane marking estimation section 155 generates the virtual lane marking VWL along the lane marking WR on the right side, detected by the white line detection section 151; and in a case where the direction estimation section 154 determines that the vehicle VC heads toward the left side of the forked road, the virtual lane marking estimation section 155 generates the virtual lane markings VWL, VWR, and the VWL1 along the lane marking WL on the left side, detected by the white line detection section 151.

For example, in a case where the direction estimation section 154 estimates that the vehicle VC heads toward the right side of the forked road in the situation shown in FIG. 15, as shown in the lower diagram on the right side in FIG. 15, the virtual lane marking estimation section 155 generates a virtual lane marking VWL along the lane marking WR on the right side, detected by the white line detection section 151. In addition, for example, in a case where the direction estimation section 154 estimates that the vehicle VC heads toward the left side of the forked road, as shown in the lower diagram on the left side in FIG. 15, the virtual lane marking estimation section 155 generates a virtual lane marking VWR along the lane marking WL on the left side, detected by the white line detection section 151. Further, in a case where the direction estimation section 154 estimates that the vehicle VC heads straight in the situation shown in FIG. 16 (that is, in the case where the vehicle heads toward the right side of the forked road), as shown in the lower diagram in FIG. 16, the virtual lane marking estimation section 155 generates a virtual lane marking VWL1 along the lane marking WR on the right side, detected by the white line detection section 151.

As described above, since in the case where the vehicle VC heads toward the right side of the forked road, the virtual lane marking VWL along the detected lane marking WR on the right side is generated and in the case where the vehicle VC heads toward the left side of the forked road, the virtual lane marking VWR along the lane marking WL on the left side is generated, the positions of the virtual lane markings VWR and VWL can be properly estimated.

The reliability estimation section 156 is the functional part which estimates reliability of the positions of the lane markings WR and WL detected by the white line detection section 151. Here, the reliability estimation section 156 corresponds to a reliability estimation part. Specifically, based on categories of the lane markings WR and WL detected by the white line detection section 151, the reliability estimation section 156 estimates the reliability of the positions of the lane markings WR and WL. Here, as the categories of the lane marking, a white solid line, a white broken line, a yellow broken line, Botts' dots, and cat's-eyes are included. The reliability estimation section 156 estimates the reliability in descending order of the reliability, which is the order of the white solid line, the white broken line, the yellow broken line, the Botts' dots, and the cat's-eyes.

The position correction section 157 is the functional part which corrects, based on the reliability of the positions of the lane markings WR and WL estimated by the reliability estimation section 156, a position of the virtual lane marking VWL1 generated by the virtual lane marking estimation section 155. Here, the position correction section 157 corresponds to a position correction part. Specifically, the position correction section 157 corrects the position of the virtual lane marking VWL1 generated by the virtual lane marking estimation section 155 more outward in accordance with a decrease in the reliability of the positions of the lane markings WR and WL estimated by the reliability estimation section 156.

For example, in the situation shown in FIG. 16, the lane marking WR on the right side in the diagram on the left side in FIG. 16 is a white solid line, and the lane marking WR on the left side in the diagram on the right side in FIG. 16 is Botts' dots. Accordingly, since the lane marking WR on the right side in the diagram in the left side in FIG. 16 is the white solid line, it is determined that the reliability of the lane marking WR on the right side is high and the position of the virtual lane marking VWL1 is not corrected. On the other hand, since the lane marking WR on the right side in the diagram on the right side in FIG. 16 is the Botts' dots, it is determined the reliability of the lane marking WR on the right side is low and the position of the virtual lane marking VWL1 is corrected to be a position of the virtual lane marking VWL2.

Figure 20:
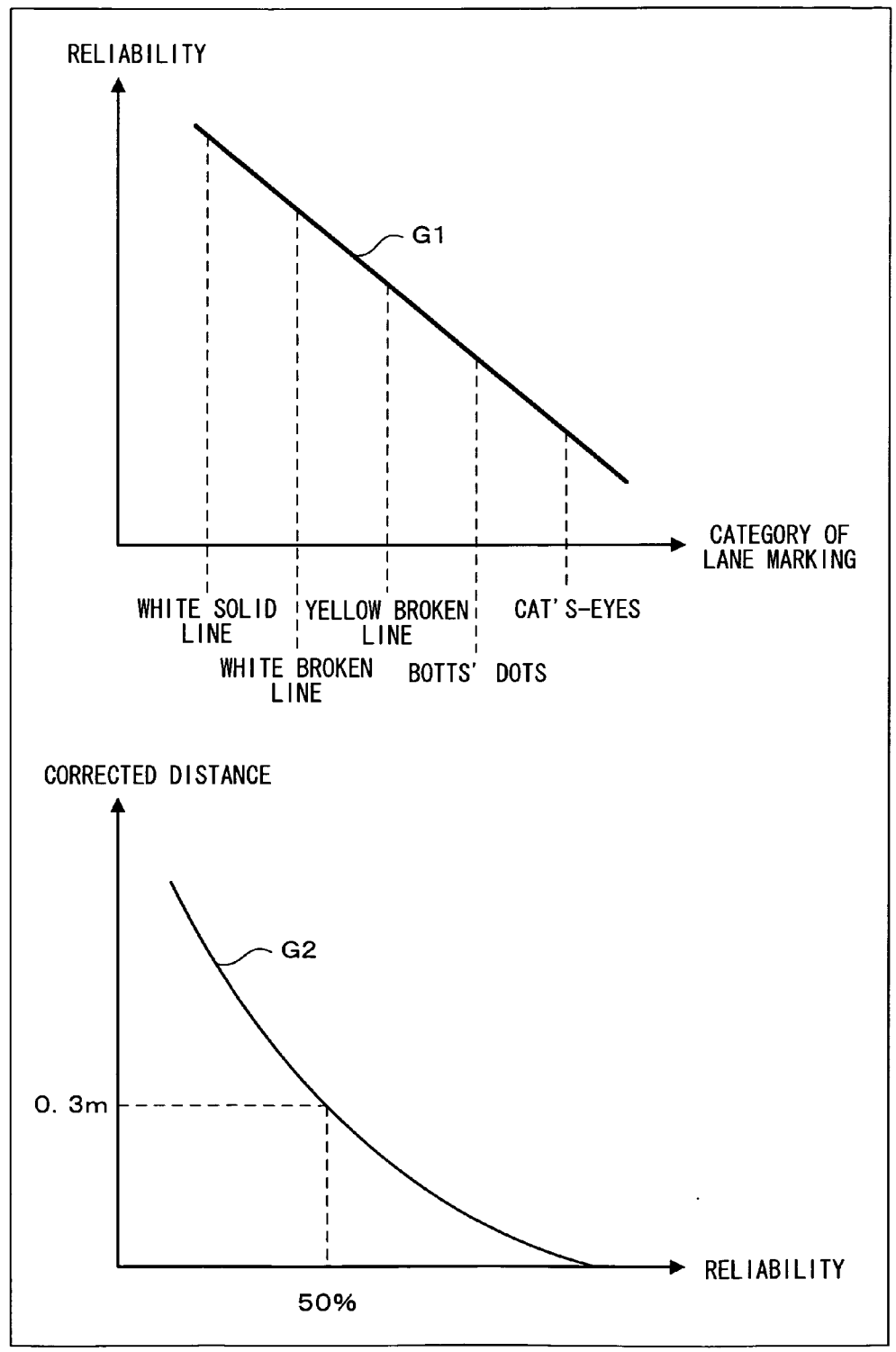
FIG. 20 is a graph for explaining one example of a method of correction of a position of a virtual lane marking, executed by a position correction section.

FIG. 20 is a graph for explaining one example of a method of the correction of the position of the virtual lane marking VWL1, executed by the position correction section 157. An upper graph in FIG. 20 is a graph G1 showing a relationship between a category (horizontal axis) of each of the lane markings WR and WL detected by the white line detection section 151 and the reliability (vertical axis) of the position of each of the lane markings WR and WL, estimated by the reliability estimation section 156. As shown in the graph G1, the reliability descends in the order of the white solid line, the white broken line, the yellow broken line, the Botts' dots, and the cat's-eyes.

A lower graph in FIG. 20 is a graph G2 showing a relationship between the reliability (horizontal axis) of the position of each of the lane markings WR and WL, estimated by the reliability estimation section 156 and a corrected distance (vertical axis) resulting from the correction performed by the position correction section 157. As shown in the graph G2, the corrected distance increases in accordance with a decrease in the reliability (that is, the position of the virtual lane marking VWL1 is corrected more outward by the position correction section 157). For example, in a case where the reliability is 50%, the position of the virtual lane marking VWL1 is corrected so as to be shifted by 0.3 m outward.

As described above, since the lower the reliability of the position of each of the detected lane markings WR and WL is, the lower the estimated reliability of the position of the generated virtual lane marking VWL1 is, it is preferable to correct the position of the generated virtual lane marking VWL1 outward of the lane in order to prevent the driving support ECU 15 from unnecessarily being operated. Therefore, since based on the reliability of the position of each of the detected lane markings WR and WL, the position of the generated virtual lane marking VWL1 is properly corrected, unnecessarily operating the driving support ECU 15 can be prevented, thereby allowing an alarm or the like to be further properly outputted.

In addition, since the reliability estimation section 156 estimates the reliability in the descending order of the reliability, which is the order of the white solid line, the white broken line, the yellow broken line, the Botts' dots, and the cat's-eyes, the reliability of the position of each of the detected lane markings WR and WL can be further properly estimated.

In the fifth embodiment, the case where the position correction section 157 corrects the position of the virtual lane marking VWL1 more outward in accordance with the decrease in the reliability estimated by the reliability estimation section 156 is described. However, conversely, the position correction section 157 may correct the position of the virtual lane marking VWL1 more inward in accordance with the decrease in the reliability estimated by the reliability estimation section 156. In this case, the departure from the lane can be prevented in a further ensured manner.

In addition, in the fifth embodiment, the case where the reliability estimation section 156 estimates the reliability in the descending order of the reliability, which is the order of the white solid line, the white broken line, the yellow broken line, the Botts' dots, and the cat's-eyes is described. However, it is only required that based on the category or the like of each of the lane markings WR and WL detected by the white line detection section 151, the reliability estimation section 156 estimates the reliability of the position of each of the lane markings WR and WL. For example, based on the category and clarity of each of the lane markings WR and WL detected by the white line detection section 151, the reliability estimation section 156 may estimate the reliability of the position of each of the lane markings WR and WL. Here, the "clarity" indicates a clear-marking-off characteristic in an image based on a color, a reflectivity, and the like of each of the lane markings WR and WL with respect to a road surface. In this case, the reliability of the position of each of the lane markings WR and WL can be further accurately estimated.

With reference back to FIG. 14, the functional configuration of the driving support ECU 15 will be described. The information outputting section 158 is the functional part which outputs the driving support information based on the virtual lane markings VWL, VWR, and VWL1 estimated by the virtual lane marking estimation section 155 or based on the position of the virtual lane marking VWL2, corrected by the position correction section 157. Here, the information outputting section 158 corresponds to an information outputting part. Specifically, based on the lane markings WR and WL detected by the white line detection section 141 and the virtual lane markings VWL, VWR, and VWL1 estimated by the virtual lane marking estimation section 155 (or the virtual lane marking VWL2 corrected by the position correction section 157), the information outputting section 158 determines a likelihood of the departure from the lane and outputs, in the case where it is determined that the likelihood of the departure is strong, the driving support information (here, the alarm or the like) via the output device 3.

Figure 17:
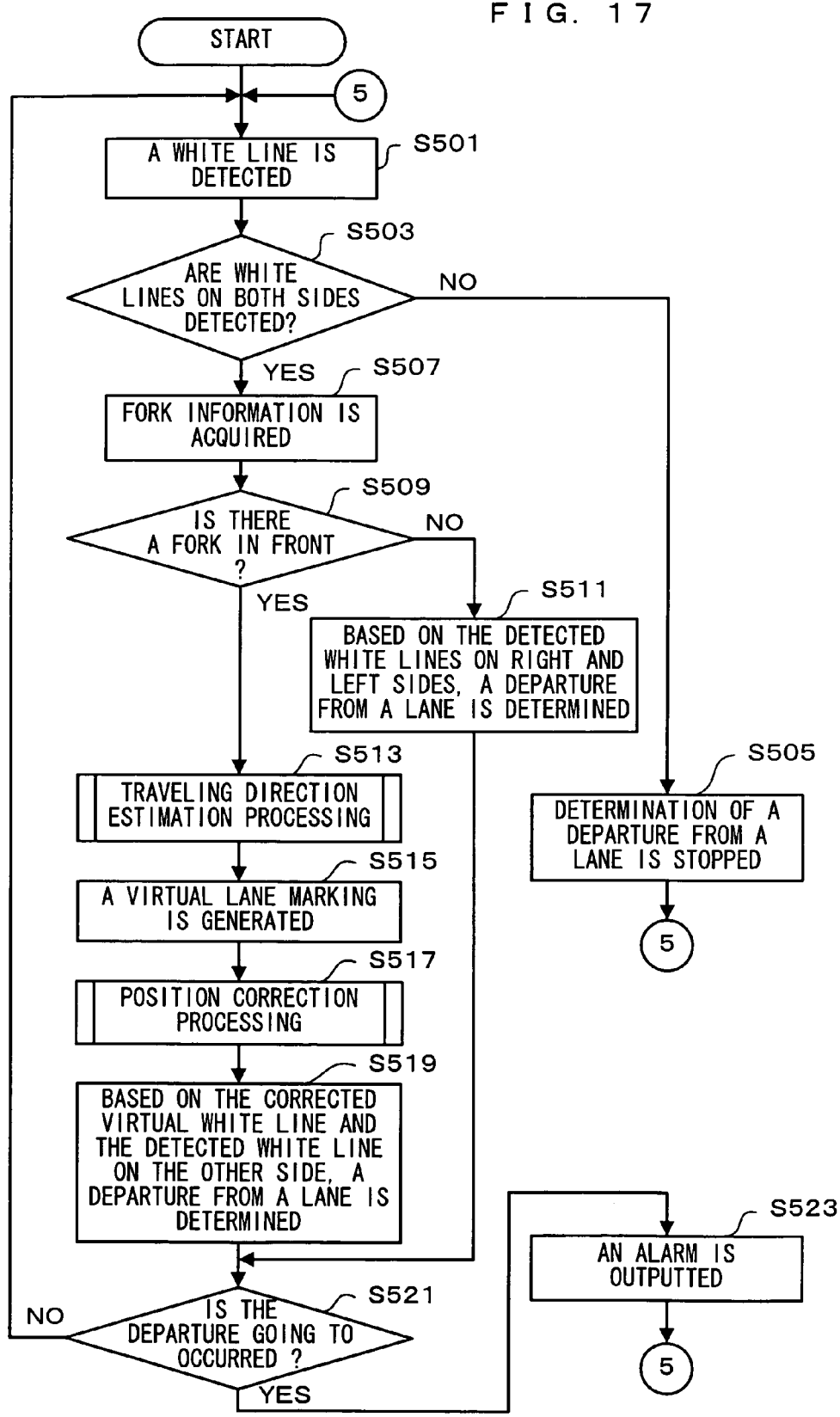
FIG. 17 is a flowchart showing one example of operations of the driving support ECU according to the fifth embodiment.

FIG. 17 is a flowchart showing one example of operations of the driving support ECU 15 according to the fifth embodiment. In the flowchart shown in FIG. 15, for convenience sake, the "lane marking" is referred to as a "white line". First, the white line detection section 151 detects the lane markings WR and WL installed on the right and left sides of the lane in which the vehicle VC is running (S501). The fork determination section 152 determines whether or not the lane markings WR and WL on the both sides are detected at step S501 (S503). In a case where it is determined that at least one of the lane markings WR and WL is not detected (NO at S503), the determination of the departure from the lane by the information outputting section 158 is stopped (S505), processing returns to step S501 and the processes at step S501 and the subsequent steps are repeatedly executed.

In a case where it is determined that the lane markings WR and WL on the both sides are detected (YES at S503), the fork determination section 152 acquires the fork information from the navigation system 22 (S507). Based on the fork information acquired at step S507, the fork determination section 152 determines whether or not there is a fork spot in front of the vehicle VC (S509). In a case where there is not the fork spot (NO at S509), the information outputting section 158 determines a likelihood of the departure from the lane based on the lane markings WR and WL detected at step S501 (S511), the processing proceeds to step S517.

In a case where there is the fork spot (YES at S509), a traveling direction estimation process in which a traveling direction of the vehicle VC at the fork spot is estimated by the direction estimation section 154 or the like is executed (S513). Based on the traveling direction estimated at step S513, the virtual lane marking estimation section 155 generates the virtual lane markings VWL, VWR, and VWL1 used for determining a likelihood of the departure from the lane (S515). Next, a position correction process in which the position of each of the virtual lane markings VWL, VWR, and VWL1 generated at step S515 is corrected by the reliability estimation section 156 and the position correction section 157 is executed (S517). Next, based on the lane markings WR and WL detected at step S501 by the information outputting section 158 and the virtual lane marking VWL, VWR, and VWL1 generated at step S513 (or the virtual lane marking VWL2 corrected at step S515), a likelihood of the departure from the lane is determined (S519).

When the process at step S511 or step S519 is finished, the information outputting section 158 determines whether or not the likelihood of the departure from the lane is strong (S521). In a case where it is determined that the likelihood of the departure from the lane is strong (YES at S521), the information outputting section 158 outputs the alarm or the like (S523), the processing returns to step S501, the processes at step S501 and the subsequent steps are repeatedly executed. In a case where it is determined that the likelihood of the departure from the lane is not strong (NO at S521), the processing returns to step S501 and the processes at step S501 and the subsequent steps are repeatedly executed.

Figure 18:
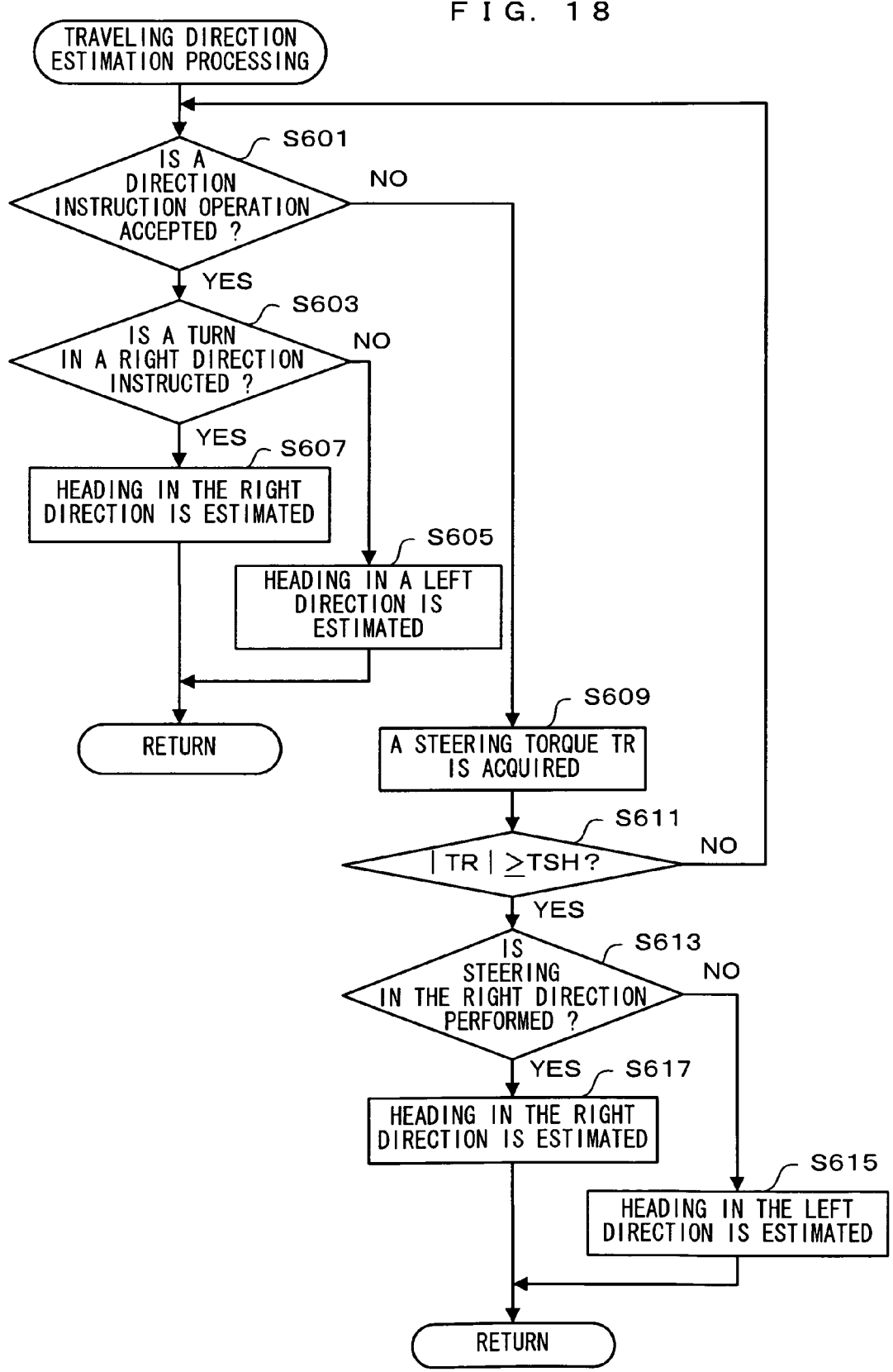
FIG. 18 is a detailed flowchart showing one example of a traveling direction estimation process executed at step S513 in the flowchart of FIG. 17.

FIG. 18 is a detailed flowchart showing one example of the traveling direction estimation process executed at step S513 in the flowchart of FIG. 17. First, the operation acquisition section 153 acquires turn signal operation information and determines whether or not a direction instruction operation has been accepted (S601). In a case where it is determined that the direction instruction operation has not been accepted (NO at S601), processing proceeds to step S609. In a case where it is determined that the direction instruction operation has been accepted (YES at S601), the direction estimation section 154 determines whether or not the direction instruction operation accepted at step S601 instructs a right direction (S603). In a case where it is determined that the right direction is instructed (YES at S603), the direction estimation section 154 estimates that the vehicle VC heads in the right direction at a fork spot (S607) and the processing returns to step S515 shown in FIG. 17. In a case where it is determined that a left direction is instructed (NO at S603), the direction estimation section 154 estimates that the vehicle VC heads in the left direction at the fork spot (S605) and the processing returns to step S515 shown in FIG. 17.

In a case of NO at step S601, the operation acquisition section 153 acquires steering torque TR information via the steering torque detection sensor 23 (S609). The direction estimation section 154 determines whether or not an absolute value of the steering torque TR acquired at step S609 is greater than or equal to the determination threshold value TSH (S611). In a case where it is determined that the absolute value of the steering torque TR is less than the determination threshold value TSH (NO at S611), the processing returns to step S601, and the processes at step S601 and the subsequent steps are repeatedly executed. In a case where it is determined that the absolute value of the steering torque TR is greater than or equal to the determination threshold value TSH, (YES at S611), the direction estimation section 154 determines, based on whether the steering torque TR acquired at step S609 is positive or negative, whether or not the steering torque TR corresponds to steering in the right direction (S613). In a case where it is determined that the steering torque TR corresponds to steering in the right direction (YES at S613), the direction estimation section 154 estimates that the vehicle VC heads in the right direction at the fork spot (S617) and the processing returns to step S515 shown in FIG. 17. In a case where it is determined that the steering torque TR corresponds to steering in the left direction (NO at S613), the direction estimation section 154 estimates that the vehicle VC heads in the left direction at the fork spot (S615) and the processing returns to step S515 shown in FIG. 17.

Figure 19:
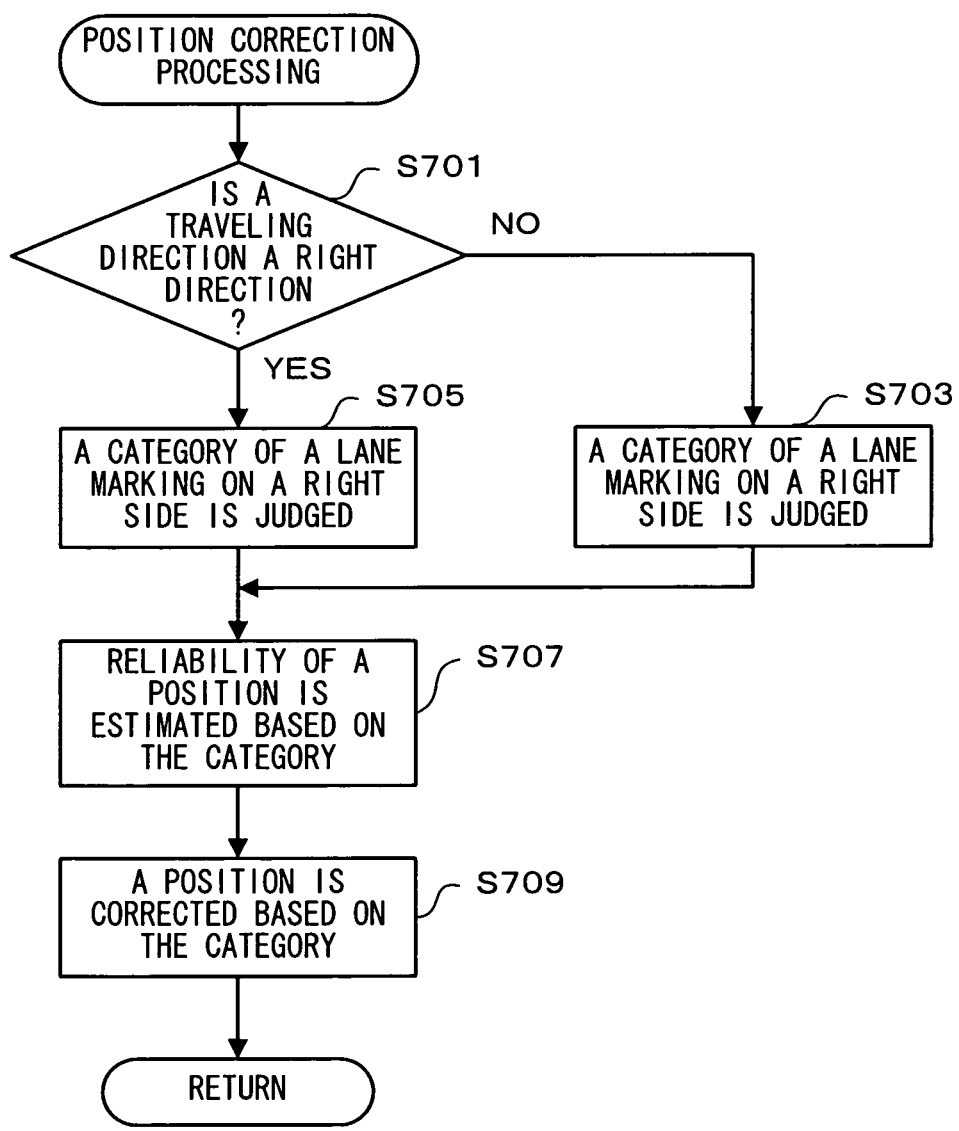
FIG. 19 is a detailed flowchart showing one example of a position correction process executed at step S517 in the flowchart of FIG. 17.

FIG. 19 is a detailed flowchart showing one example of the position correction process executed at step S517 in the flowchart of FIG. 17. First, the virtual lane marking estimation section 155 determines whether or not it is estimated at step S513 in the flowchart of FIG. 17 that the vehicle VC heads in the right direction (S701). In a case where it is estimated that the vehicle VC heads in the left direction (NO at S701), the reliability estimation section 156 judges a category of the lane marking WL on the left side (S703). In a case where it is estimated that the vehicle VC heads in the right direction (YES at S701), the reliability estimation section 156 judges a category of the lane marking WR on the right side (S705).

In a case where the process at step S703 or step S705 is finished, the reliability estimation section 156 estimates the reliability of the position of the lane marking WR (or the lane marking WL) based on the category of the lane marking WR (or the lane marking WL) estimated at step S703 or step S705 (S707). The position correction section 157 corrects the position of the virtual lane marking VWL1 generated at step S515 shown in FIG. 17 based on the reliability estimated at step S707 and the processing returns to step S519 shown in FIG. 17.

As described above, based on the information indicating the position of the vehicle VC and the map information, it is determined whether or not there is a fork spot in a road, on which the vehicle VC is running, in front of the vehicle VC. Thus, it can be properly determined whether or not there is the fork spot in the road. In addition, in the case where it is determined that there is the fork spot in the road, the virtual lane marking VWR, VWL, and VWL1 used for outputting the alarm or the like indicating the departure from the lane at the fork spot in the road are generated so as to traverse the estimated forked road which is not in the traveling direction. Thus, the position of the virtual lane marking VWR, VWL, and VWL 1 can be properly estimated (refer to FIG. 15 and FIG. 16). Further, the alarm or the like is outputted based on the virtual lane marking VWR, VWL, and VWL1 which are estimated so as to be at proper positions. Thus, the proper alarm or the like can be outputted.

The driving support apparatus according to the present invention is not limited to the above-described embodiments and may be realized as described below.

(A) In the first embodiment, the driving support ECU 11 comprising as the functional parts: the white line detection section 111; the roadside object detection section 112; the white line estimation section 113; the information outputting section 114; and the like is described. However, at least one of the functional parts of the white line detection section 111; the roadside object detection section 112; the white line estimation section 113; and the information outputting section 114 may be realized by hardware such as an electrical circuit.

Similarly, in the second embodiment, the driving support ECU 12 comprising as the functional parts: the white line detection section 121; the roadside object detection section 122; the distance setting section 123; the virtual lane marking estimation section 124; the information outputting section 125; and the like is described. However, at least one of the functional parts of the white line detection section 121; the roadside object detection section 122; the distance setting section 123; the virtual lane marking estimation section 124; and the information outputting section 125 may be realized by hardware such as an electrical circuit.

Similarly, in the third embodiment, the driving support ECU 13 comprising as the functional parts: the white line detection section 131; the lane determination section 132; the center line estimation section 133; the information outputting section 134; and the like is described. However, at least one of the functional parts of the white line detection section 131; the lane determination section 132; the center line estimation section 133; and the information outputting section 134 may be realized by hardware such as an electrical circuit.

Similarly, in the fourth embodiment, the driving support ECU 14 comprising as the functional parts: the white line detection section 141; the stopping lane determination section 142; the lane marking correction section 143; the information outputting section 144; and the like is described. However, at least one of the functional parts of the white line detection section 141; the stopping lane determination section 142; the lane marking correction section 143; and the information outputting section 144 may be realized by hardware such as an electrical circuit.

Similarly, in the fifth embodiment, the driving support ECU 15 comprising as the functional parts: the white line detection section 151; the fork determination section 152; the operation acquisition section 153; the direction estimation section 154; the virtual lane marking estimation section 155; the reliability estimation section 156; the position correction section 157; the information outputting section 158; and the like is described. However, at least one of the functional parts of the white line detection section 151; the fork determination section 152; the operation acquisition section 153; the direction estimation section 154; the virtual lane marking estimation section 155; the reliability estimation section 156; the position correction section 157; and the information outputting section 158 may be realized by hardware such as an electrical circuit.

(B) In the first embodiment through the fifth embodiment, the driving support ECU 1 (namely, the driving supports ECU 11 through 15) which outputs the driving support information for preventing the departure from the lane in which the vehicle VC is running is described. However, the driving support ECU 1 may output other driving support information. For example, the driving support ECU 1 may output driving support information for supporting a driver in changing a lane (or in overtaking).

(C) In the first embodiment through the fifth embodiment, the driving support ECU 1 (namely, the driving supports ECU 11 through 15) which detects the lane markings, the roadside object, and the like based on the image information from the CCD camera 21 is described. However, the driving support ECU 1 may detect the lane markings, the roadside object, and the like by employing other method. For example, the driving support ECU 1 may detect the roadside object and the like via a radar device. In addition, for example, the driving support ECU 1 may detect the lane markings, the roadside object, and the like based on image information from other type of a camera (for example, a CMOS camera).

While the invention has been described in detail, the foregoing description is in all aspects illustrative and not restrictive. It is understood that numerous other modifications and variations can be devised without departing from the scope of the invention.

What is claimed is:

1. A driving support apparatus, mounted in a vehicle and operable to output driving support information to a driver, comprising:
   a white line detection part for detecting a lane marking installed on at least one of a right side and a left side of a lane in which the vehicle is running;
   a roadside object detection part for detecting, in a case where one of lane markings on one of the right side and the left side is detected and the other of the lane markings on the other of the right side and the left side is not detected by the white line detection part, a roadside object installed on the other of the right side and the left side in parallel with the one of the lane markings on the one of the right side and the left side:
   a white line estimation part for estimating a position of the other of the lane markings on the other of the right side and the left side based on the roadside object detected by the roadside object detection part and installed on the other of the right side and the left side in parallel with the one of the lane markings on the one of the right side and the left side; and
   an information outputting part for outputting the driving support information based on the position of the other of the lane markings on the other of the right side and the left side, the position estimated by the white line estimation part, wherein
   the information outputting part does not output the driving support information in a case where the roadside object installed on the other of the right side and the left side in parallel with the one of the lane markings on the one of the right side and the left side is not detected by the roadside object detection part.

2. The driving support apparatus according to claim 1, wherein the white line estimation part estimates, as a position of the other of the lane markings on the other of the right side and the left side, a position which is located at a predetermined first distance inward of the lane, in which the vehicle is running, from the position of the roadside object detected by the roadside object detection part.

3. The driving support apparatus according to claim 1, wherein the information outputting part outputs the driving support information for preventing a departure from the lane in which the vehicle is running.

4. The driving and support apparatus according to claim 2, wherein the information outputting part outputs the driving support information for preventing a departure from the lane in which the vehicle is running.

* * * * *